(12) United States Patent
Ritchey et al.

(10) Patent No.: US 9,590,468 B2
(45) Date of Patent: Mar. 7, 2017

(54) ELECTRICAL MACHINES SUCH AS GENERATORS AND MOTORS

(71) Applicant: EXRO TECHNOLOGIES INC., West Vancouver, CA (US)

(72) Inventors: Jonathan Gale Ritchey, Vernon (CA); Daryl Anton Wagner, North Vancouver, CA (US)

(73) Assignee: EXRO TECHNOLOGIES INC., North Vancouver (CA)

( * ) Notice: Subject to any disclaimer, the term of this patent is extended or adjusted under 35 U.S.C. 154(b) by 426 days.

(21) Appl. No.: 14/048,947

(22) Filed: Oct. 8, 2013

(65) Prior Publication Data

US 2014/0252922 A1    Sep. 11, 2014

Related U.S. Application Data

(60) Provisional application No. 61/711,086, filed on Oct. 8, 2012.

(51) Int. Cl.
| | |
|---|---|
| *H02K 7/08* | (2006.01) |
| *H02K 1/18* | (2006.01) |

(Continued)

(52) U.S. Cl.
CPC .............. *H02K 7/083* (2013.01); *H02K 1/185* (2013.01); *H02K 5/1737* (2013.01);
(Continued)

(58) Field of Classification Search
CPC ...... H02K 1/185; H02K 5/1737; H02K 5/225; H02K 7/083; H02K 7/088; H02K 7/1838; Y02E 10/725

(Continued)

(56) References Cited

U.S. PATENT DOCUMENTS 3,332,728 A * 7/1967 Gibson ................. F16C 19/166
                                                          29/898.066
3,353,028 A   11/1967 Braikevitch et al.
(Continued)

FOREIGN PATENT DOCUMENTS

CN      201584845 U    9/2010
CN      201708625 U    1/2011
(Continued)

OTHER PUBLICATIONS

"Antifriction wire race bearings; Linear guides; Positioning systems," Franke, Franke Company Catalog, downloaded on Jun. 6, 2008, from www.franke-gmbh.cm, 22 pages.
(Continued)

*Primary Examiner* — John K Kim
(74) *Attorney, Agent, or Firm* — Seed IP Law Group LLP

(57) ABSTRACT

An electric machine may employ a distributed bearing, for example spaced radially outwardly of a longitudinal center of a rotor and stator assembly. The distributed bearing may take the form of a wire race bearing, which positions a rotor assembly relative to a stator assembly to maintain an air gap therebetween. The rotor assembly may be concentrically located within the stator assembly. Electrically insulative fasteners may couple a race assembly to the stator or rotor assembly. Compensation fastener assemblies may couple the wire race assembly to the rotor or stator assembly, to compensate for differential expansion for instance thermal differential expansion along a longitudinal axis of the electric machine. The electric machines may be arranged in series, for example with drive shafts arranged along a common axis, and may be coupled to the same source of motion (e.g., propeller of wind turbine, without or with a gear box).

15 Claims, 25 Drawing Sheets

(51) Int. Cl.
H02K 5/173 (2006.01)
H02K 5/22 (2006.01)
H02K 7/18 (2006.01)

(52) U.S. Cl.
CPC ............. *H02K 5/225* (2013.01); *H02K 7/088* (2013.01); *H02K 7/1838* (2013.01); Y02E 10/725 (2013.01)

(58) Field of Classification Search
USPC ..................................... 310/90, 91, 418, 425
IPC .......................................................... H02K 7/08
See application file for complete search history.

(56) References Cited

U.S. PATENT DOCUMENTS

| | | | | |
|---|---|---|---|---|
| 3,543,367 | A | * | 12/1970 | Arnot ................... F16C 19/163 29/434 |
| 4,505,525 | A | * | 3/1985 | Wolzenburg ............ F16C 19/38 384/548 |
| 4,568,205 | A | * | 2/1986 | Basener ................. F16C 19/166 384/501 |
| 4,635,330 | A | * | 1/1987 | Fritz ..................... F16C 19/183 29/404 |
| 4,797,008 | A | | 1/1989 | Helbig et al. |
| 4,863,294 | A | * | 9/1989 | Bertram ................. D04B 15/00 384/620 |
| 5,252,029 | A | | 10/1993 | Barnes |
| 5,735,615 | A | | 4/1998 | Pontzer |
| 6,002,187 | A | | 12/1999 | Ohkura et al. |
| 6,006,792 | A | | 12/1999 | Krumm et al. |
| 6,911,741 | B2 | | 6/2005 | Pettersen et al. |
| 7,018,071 | B1 | | 3/2006 | Belousova et al. |
| 7,180,204 | B2 | | 2/2007 | Grant et al. |
| 7,456,534 | B2 | | 11/2008 | Engstrom |
| 7,656,135 | B2 | | 2/2010 | Schram et al. |
| 7,687,932 | B2 | | 3/2010 | Casazza et al. |
| 7,944,074 | B2 | | 5/2011 | Longtin et al. |
| 7,956,484 | B2 | | 6/2011 | Stiesdal |
| 7,990,006 | B2 | | 8/2011 | Stiesdal |
| 8,178,988 | B2 | | 5/2012 | Numajiri |
| 8,196,304 | B1 | | 6/2012 | McBride |
| 8,198,749 | B2 | | 6/2012 | Numajiri |
| 8,319,385 | B2 | * | 11/2012 | Breucker ............ F16C 32/0493 310/90.5 |
| 8,358,028 | B2 | | 1/2013 | Stiesdal |
| 8,373,299 | B2 | | 2/2013 | Sharples et al. |
| 8,388,491 | B2 | | 3/2013 | Ciszak et al. |
| 2005/0180737 | A1 | * | 8/2005 | Kurita .................. B65G 49/061 392/418 |
| 2007/0258671 | A1 | | 11/2007 | Siemer et al. |
| 2011/0115234 | A1 | | 5/2011 | Stiesdal |
| 2012/0270692 | A1 | * | 10/2012 | Hoebel ................. F16H 49/001 475/149 |
| 2012/0315129 | A1 | | 12/2012 | Castell Martínez et al. |
| 2013/0020893 | A1 | | 1/2013 | Bradley et al. |
| 2014/0252922 | A1 | * | 9/2014 | Ritchey ................ H02K 1/185 310/425 |

FOREIGN PATENT DOCUMENTS

| | | |
|---|---|---|
| CN | 201789360 U | 4/2011 |
| CN | 201868989 U | 6/2011 |
| CN | 202260768 U | 5/2012 |
| EP | 0 627 805 B1 | 12/1996 |
| EP | 1 657 437 A1 | 5/2006 |
| EP | 2 143 938 A1 | 1/2010 |
| EP | 2 436 943 A1 | 4/2012 |
| JP | 2005-341653 A | 12/2005 |
| JP | 2007-292094 A1 | 11/2007 |
| JP | 2008-82415 A | 4/2008 |
| KR | 10-0617557 B1 | 9/2006 |
| WO | 2010/092402 A1 | 8/2010 |
| WO | 2011/065893 A1 | 6/2011 |
| WO | 2012/013200 A1 | 2/2012 |
| WO | 2012/017084 A1 | 2/2012 |
| WO | 2012/092967 A1 | 7/2012 |
| WO | 2012/138725 A1 | 10/2012 |
| WO | 2013/042294 A1 | 3/2013 |

OTHER PUBLICATIONS

"Electrical resistivity and conductivity," from Wikipedia, the free encyclopedia, downloaded on Sep. 13, 2012, from www.en.Wikipedia.org/wiki/Electrical_resistivity_and_conductivity, Sep. 7, 2012, 13 pages.

"Product Announcement: 4-Point Wire Race Bearings," Franke, downloaded on Sep. 7, 2012, from http://beta.globalspec.com/featuredProducts/Detail/FrankeGmbH/4P/, 4 pages.

"Slewing Bearings," SKF—the knowledge engineering company, SKF Catalog, Sep. 2009, 120 pages.

Bang et al., "Review of Generator Systems for Direct-Drive Wind Turbines," Electrical Power Processing / DUWIND, Delft University of Technology, Mekelweg 4, 2628 CD Delft, The Netherlands, downloaded on May 2, 2008, 11 pages.

Bernoff et al., "Conversion of wave energy to electricity," *Scandinavian Shipping Gazette*, downloaded on Feb. 7, 2013, from http://shipgaz.com/old/magazine/issues/2004/18/1804_artikel2.php, Oct. 18, 2006, 4 pages.

Engstrom et al., "Design of NewGen Direct-Drive Generator for Demonstration in a 3,5 MW Wind Turbine," In *EWEC* (*European Wind Energy Conference & Exhibition*:1-7, May 7-10, 2007, 10 pages.

International Search Report mailed on Jan. 14, 2014, for Corresponding International Patent Application No. PCT/US2013/063890, filed on Oct. 8, 2013, 11 pages.

Ramsey, "On the Rebound: Scientists invent regenerative shocks," *Gizmag via iCars*, downloaded on Feb. 7, 2013, from http://www.autoblog.com/2009/02/01/on-the-rebound-scientists-invent-regenerative-shocks/, Feb. 1, 2009, 2 pages.

Shrestha et al., "Direct Drive Wind Turbine Generator with Magnetic Bearing," Electrical Power Processing/ DUWIND, Delft University of Technology, Mekelweg 4, 2628CD, Delft, Netherlands, Jan. 2007, 10 pages.

\* cited by examiner

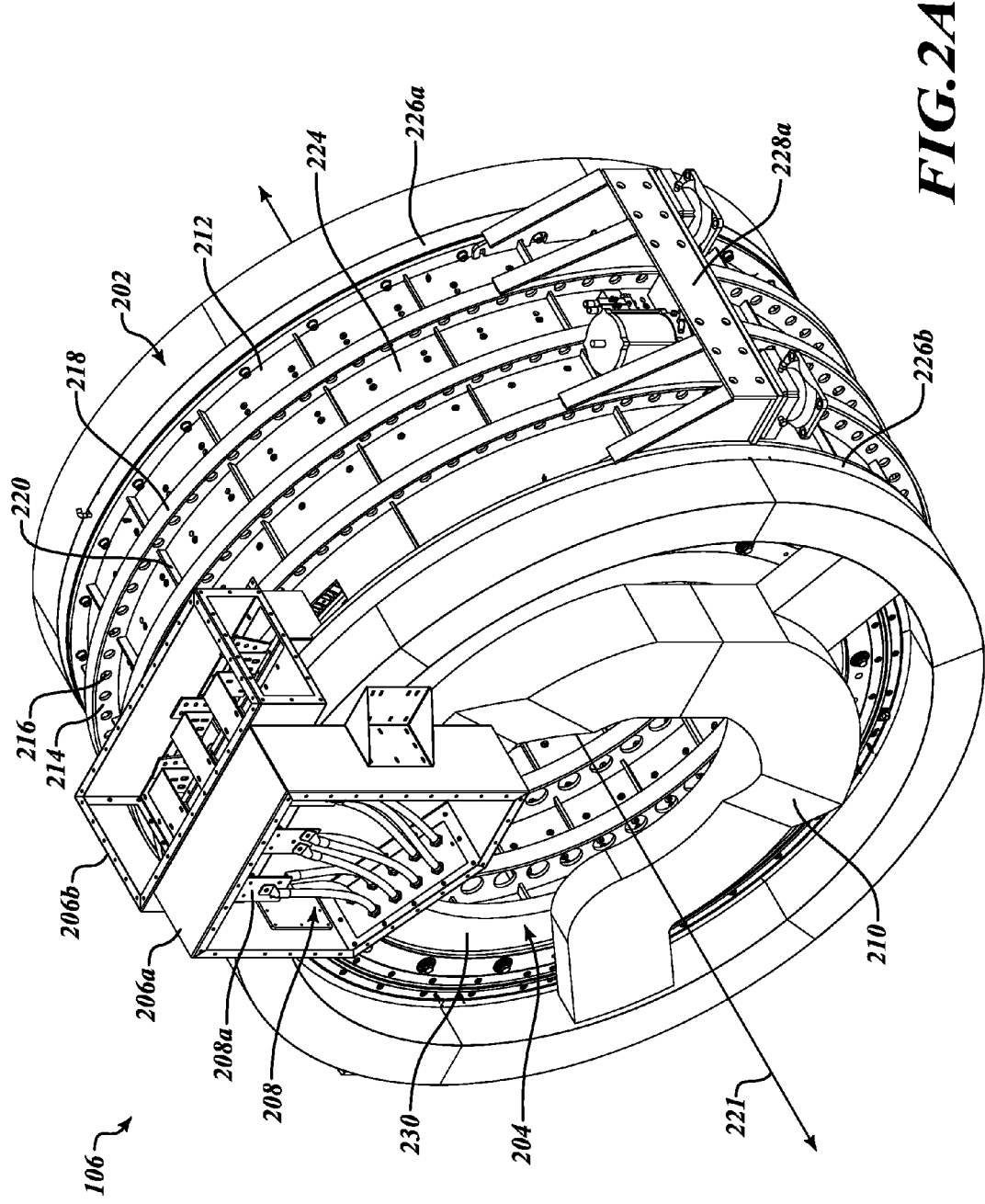

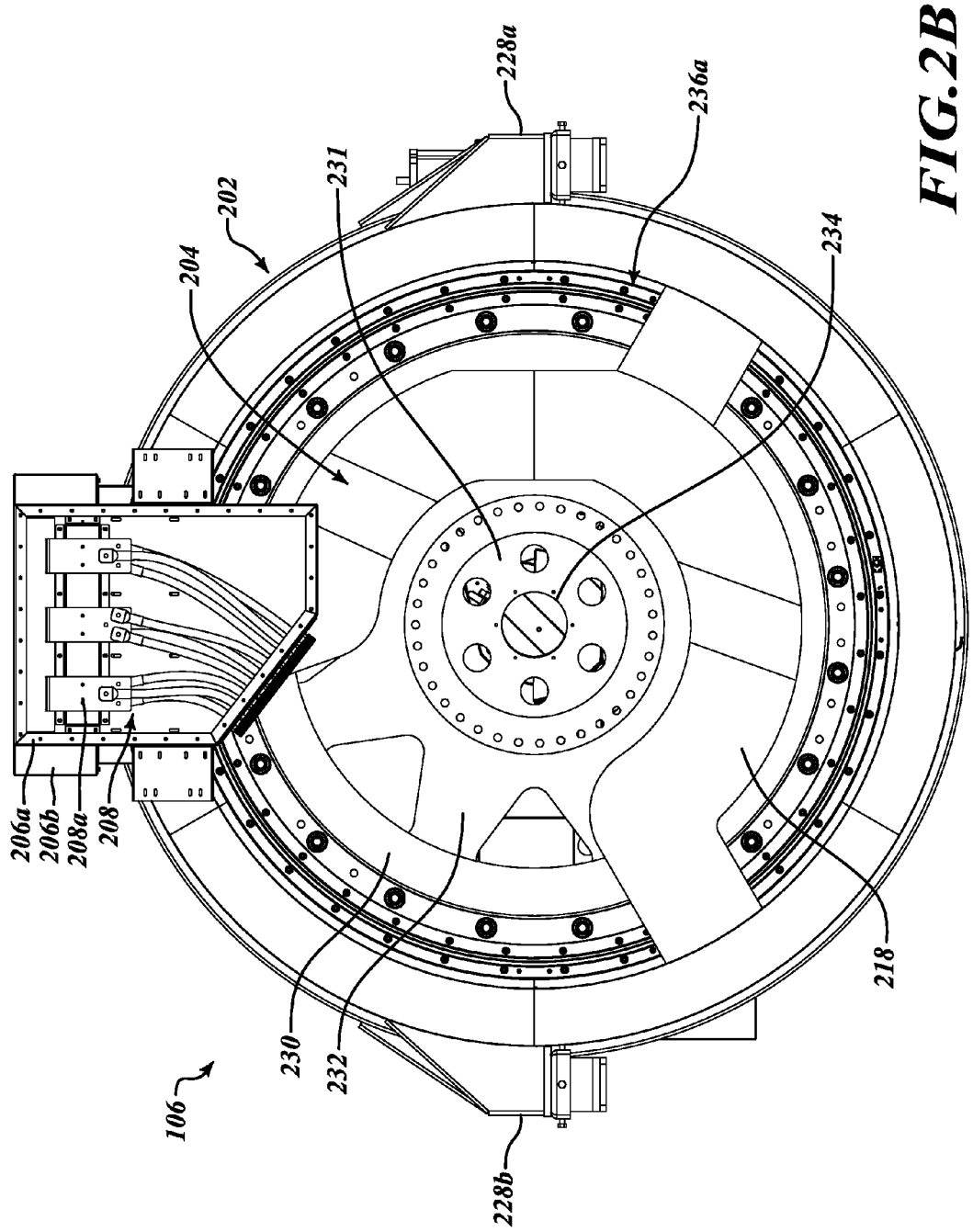

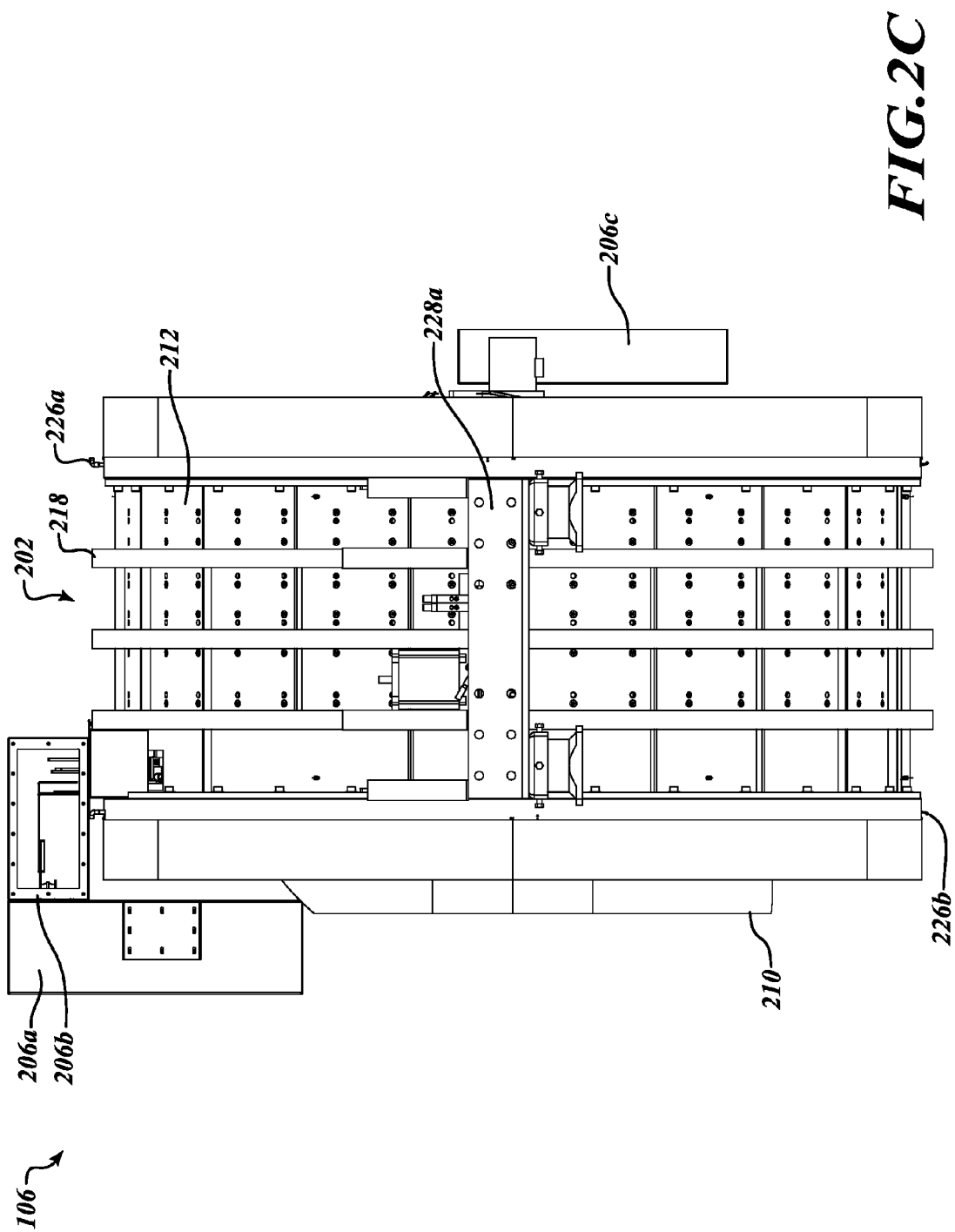

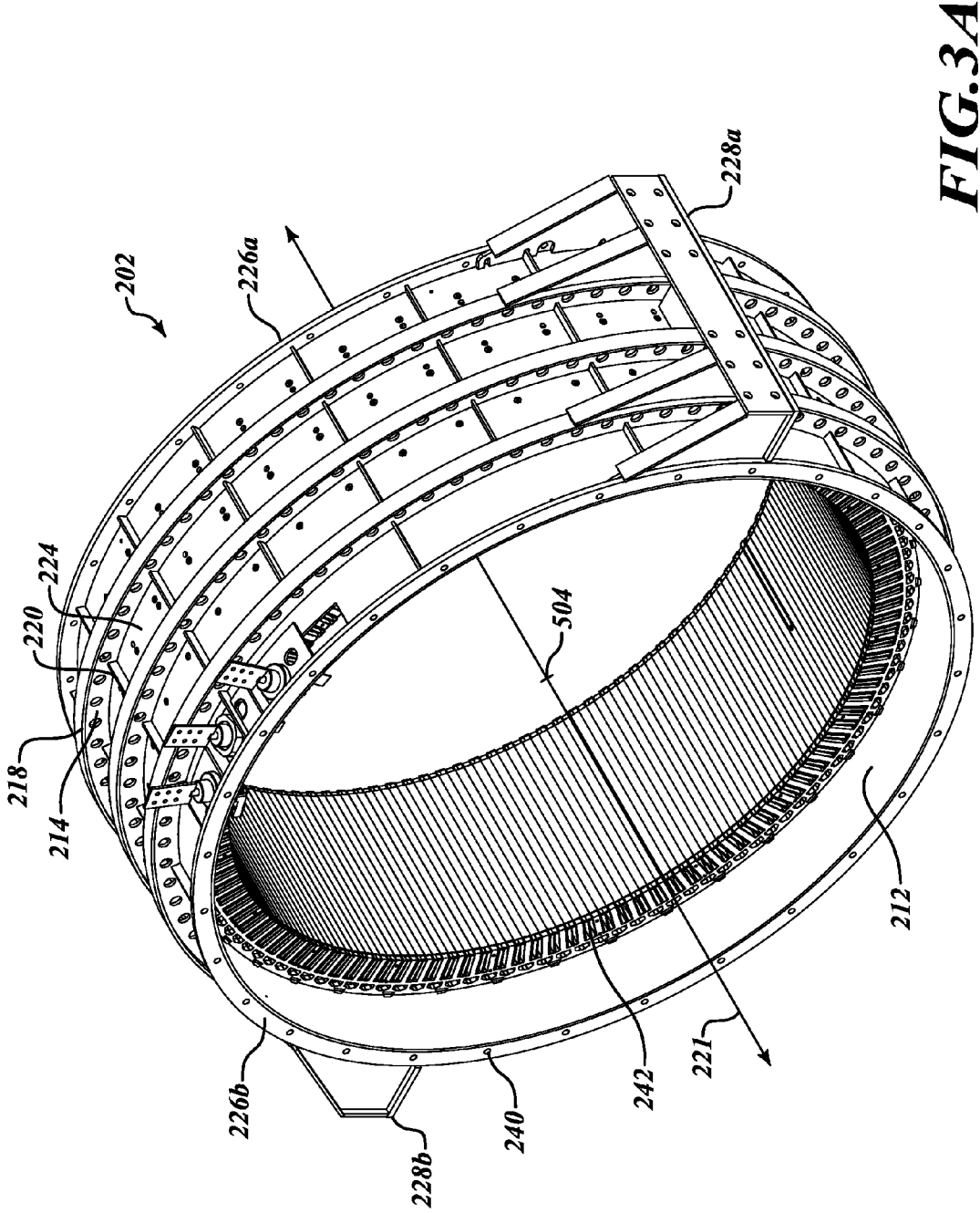

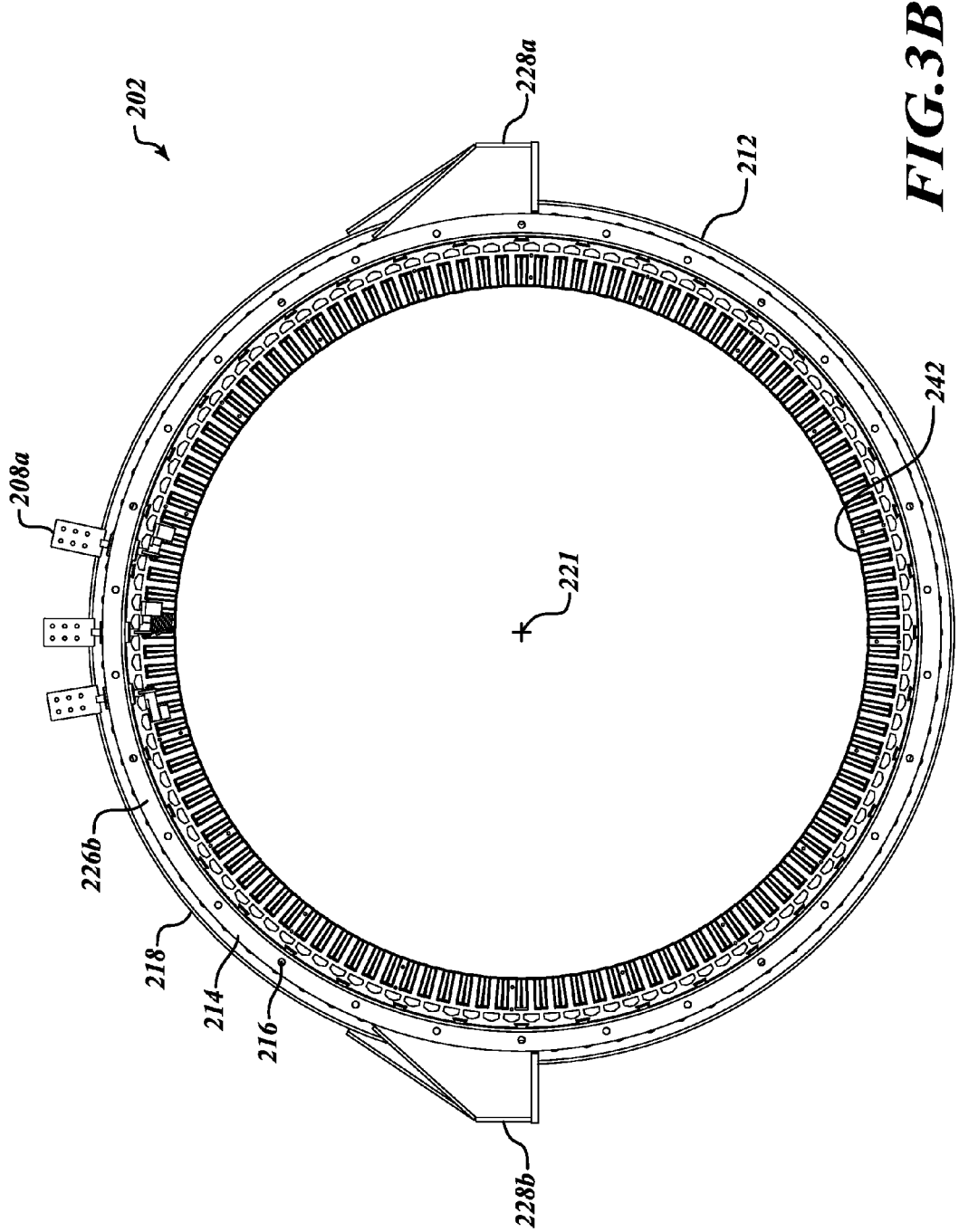

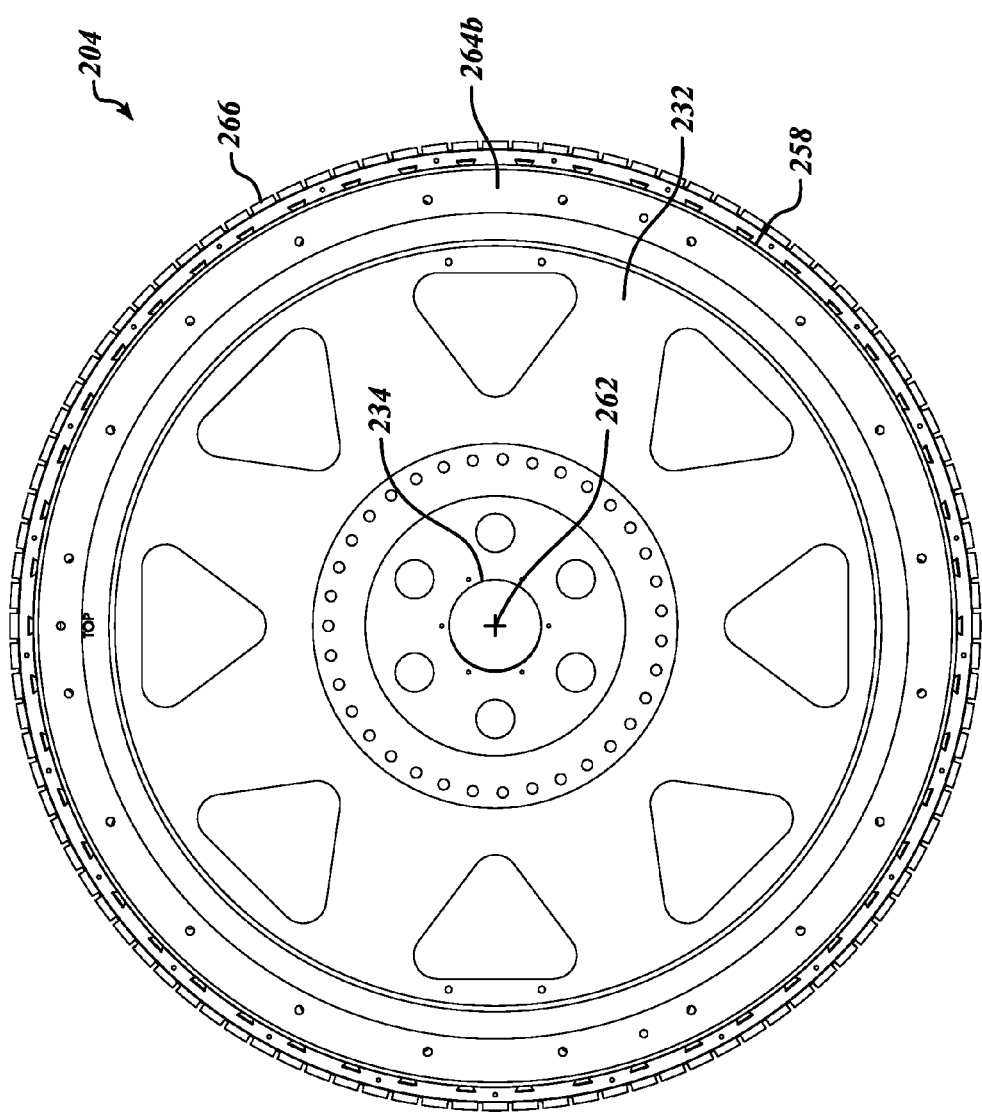

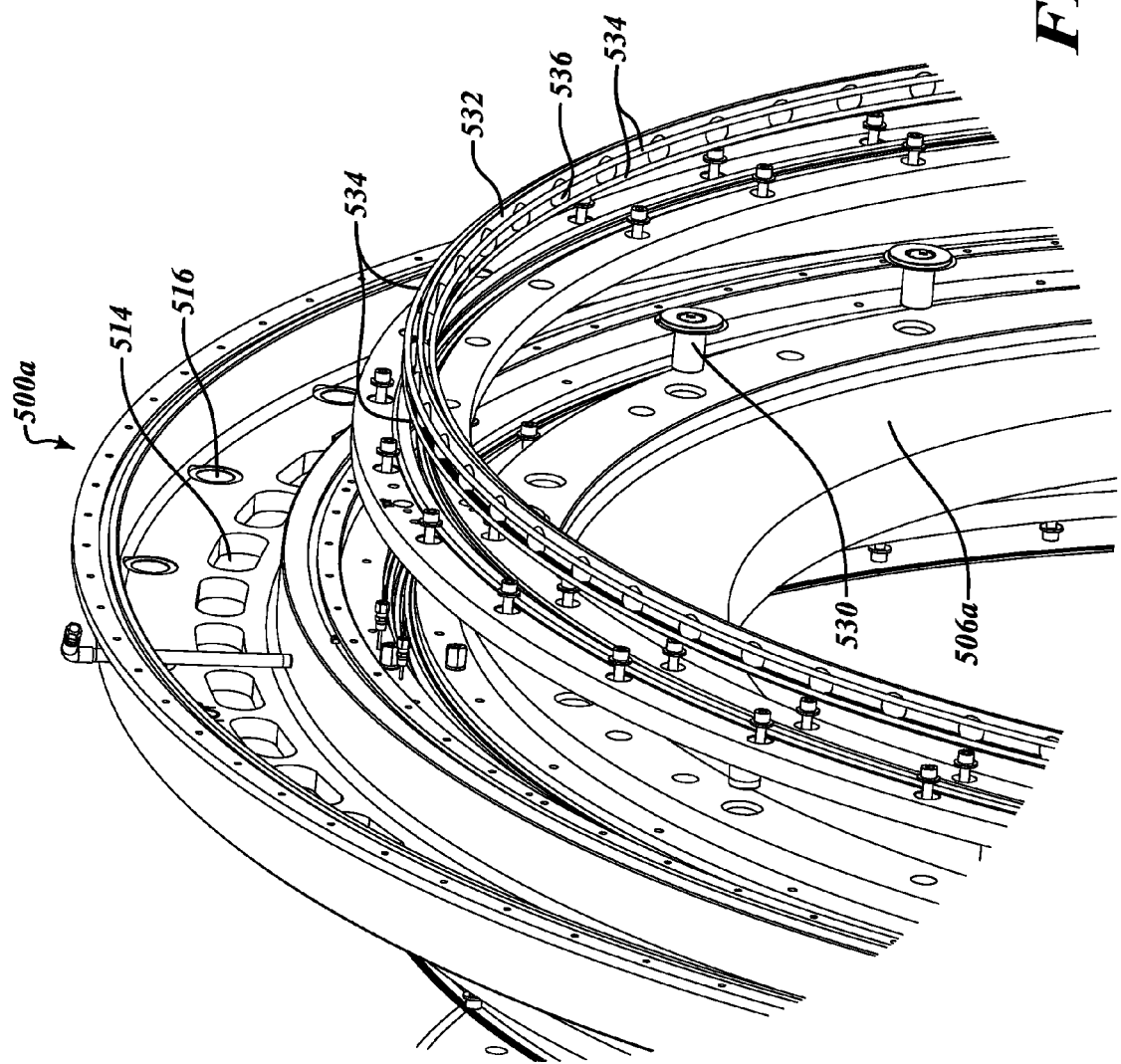

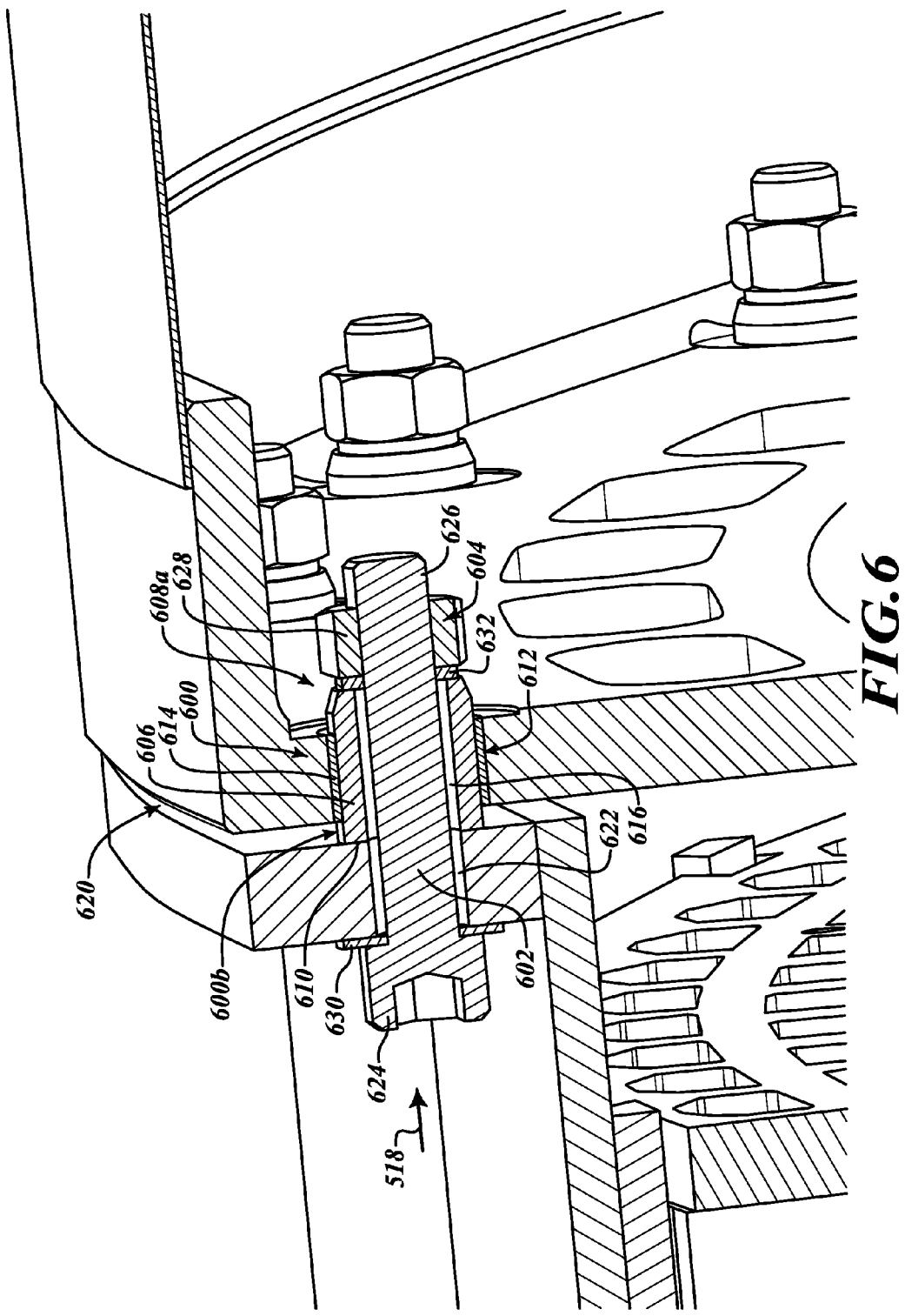

ELECTRICAL MACHINES SUCH AS GENERATORS AND MOTORS

BACKGROUND

Technical Field

The present disclosure generally relates to rotating electrical machines, such as generators or electric motors, and more particularly to rotating electrical machines employed in environments in which low weight and/or a configurable structure may be advantageous.

Description of the Related Art

Rotating electrical machines may take a various forms, the most ubiquitous being generators and electric motors. Rotating electrical machines typically include two major components, denominated as the stator and the rotor. The stator typically remains stationary, although in some implementations may move. The rotor is typically mounted for rotation with respect to the stator. Rotating electrical machines conventionally employ wire windings and magnets. In the case of generators, relative movement of the magnets, typically permanent magnets, with respect to the wire windings induces an electrical current in the windings. In the case of electric motors, passage of electrical current through various windings produces electromagnetic forces, which attract, and optionally, repel the magnets, inducing rotation. The wire windings may be carried by the stator, while the magnets may be carried by the rotor to rotate therewith. Conversely, the magnets may be carried by the stator, while the wire windings may be carried by the rotor to rotate therewith. One of skill in the art will recognize that a wide variety of arrangements are possible, including arrangements other than those described above.

Rotating electrical machines are used in a large variety of different environments for various applications. Many of these environments and/or applications impose certain constraints on the design and/or operation of the rotating electrical machines. For example, rotating electric machines may be employed in turbines, for instance for use in generating electric power from renewable resources such as wind or water. In the case of wind powered turbines, the rotating electric machine is typically installed in a nacelle or other housing at the top of a relatively tall tower. Such places significant constraints on the size (e.g., diameter) and/or weight of the rotating electric machine. Given the expense of replacing malfunctioning rotating electric machines in such environments, such also requires a design that is robust and able to operate over long periods of time with minimal or no replacement or repair. Even when employed in more accessible environments, for instance as an electric motor in a vehicle such as a hybrid or electric automobile, truck or bus, constraints exist on size and/or weight, and robustness is always desirable.

An electric machine may employ a distributed bearing, for example spaced radially outwardly of a longitudinal center of a rotor and stator assembly. The distributed bearing may take the form of a wire race bearing, which positions a rotor assembly relative to a stator assembly to maintain an air gap therebetween. The rotor assembly may be concentrically located within the stator assembly. Electrically insulative fasteners may couple a race assembly to the stator or rotor assembly. Compensation fastener assemblies may couple the wire race assembly to the rotor or stator assembly, to compensate for differential expansion (for instance, thermal differential expansion along a longitudinal axis of the electric machine). A number of electric machines may be arranged in series, for example with drive shafts arranged along a common axis, and may be coupled to be driven by the same source of motion (e.g., propeller of a wind turbine, without or with a gear box).

BRIEF SUMMARY

The electric machine includes at least one moving part, typically the rotor which moves relative to the stator. As previously noted, one of the rotor or stator typically carries magnets, while the other one of the rotor or stator typically carries windings or coils. The space between the magnets and the coils is commonly referred to as the air gap. It is typically highly desirable to minimize a distance between magnets and coils in an electric machine, to achieve the highest efficiency conversion possible. It is also highly desirable to maintain the air gap.

The electric machine may be subject to a variety of forces, some induced by the intended movement of the parts, and some induced by unintended shaking, vibration or other forces. Thus, it is desirable to build the electric machine to be robust, with rigid parts that will not flex or come out of alignment during operation in order to maintain the air gap. Such is typically achieved using relatively heavy components.

It is however often desirable to keep the weight of the electric machine as small as possible. This may be a particular concern in certain applications, for example where the electric machine is to be used at the top of a tall tower, or even when the electric machine is to be used in an aircraft. Disclosed herein are a number of approaches to manufacture an electric machine with relatively low weight, yet which may have sufficient strength, rigidity or stiffness to maintain the air gap.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 2A is an isometric view of an electric machine, according to one illustrated embodiment of the disclosed systems, methods and apparatus.

FIG. 2B is a front elevational view of the electric machine of FIG. 2A.

FIG. 2C is a right side elevational view of the electric machine of FIG. 2A.

FIG. 3A is an isometric view of a stator assembly of an electric machine such as that illustrated in FIGS. 2A-2D, according to one illustrated embodiment of the disclosed systems, methods and apparatus.

FIG. 3B is a front elevational view of the stator assembly of FIG. 3A.

FIG. 4D is a rear elevational view of the rotor assembly of FIG. 2A.

Figure 5A:
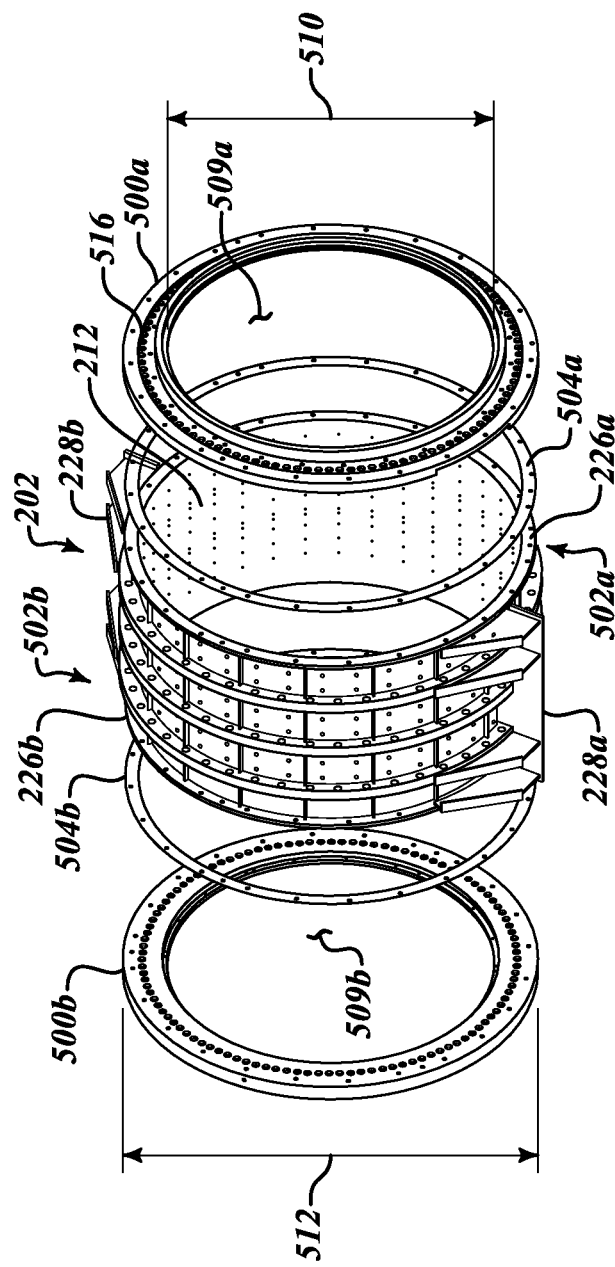

FIG. 5A is an isometric exploded view of a stator assembly of an electric machine, such as that illustrated in FIGS. 2A-2D, with a pair of bearing race members physically attachable at respective ends of the stator assembly, and a pair of electrically insulative rings received between the stator assembly and respective ones of the bearing inner race members according to one illustrated embodiment of the disclosed systems, methods and apparatus.

Figure 5B:
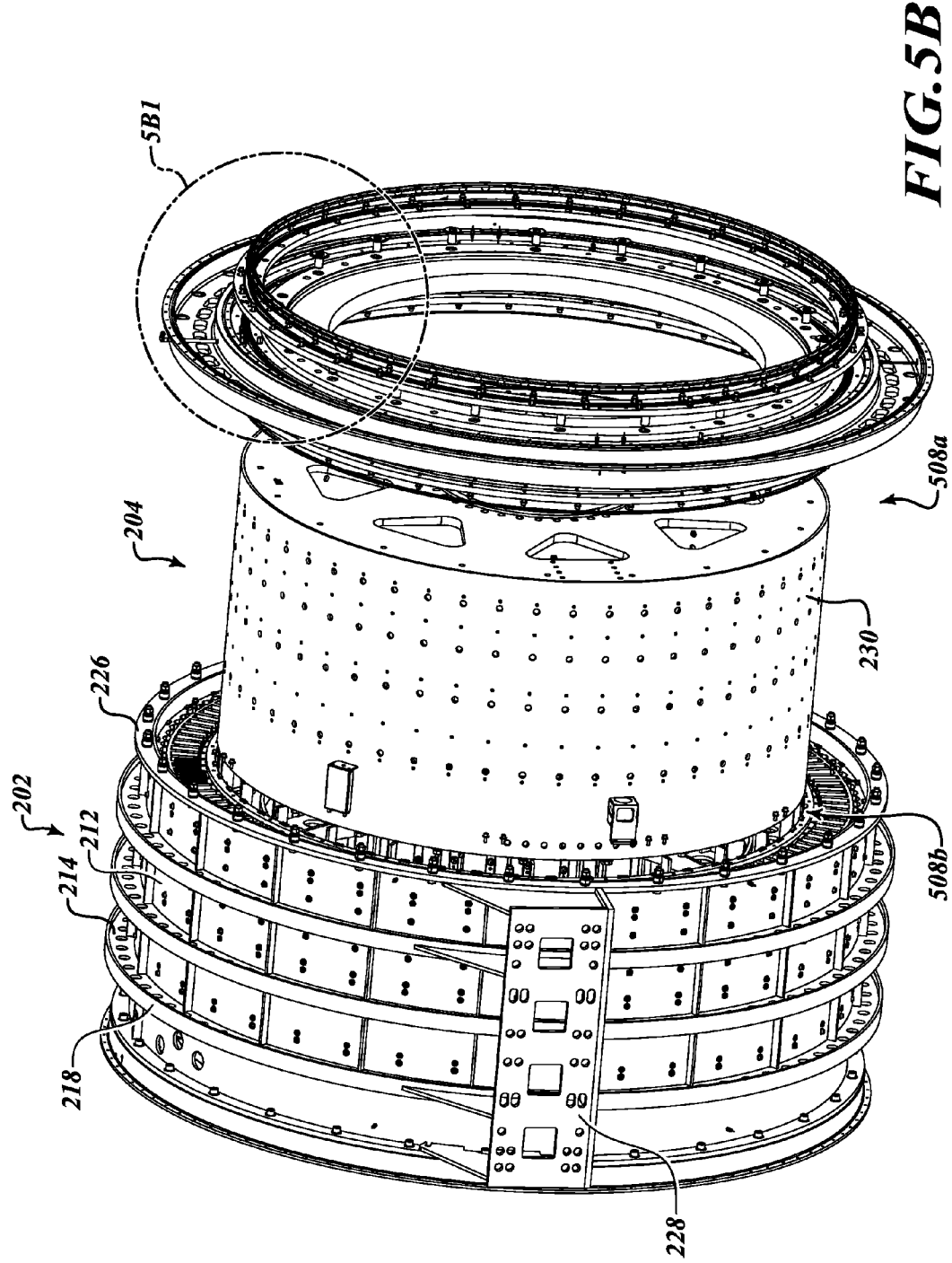

FIG. 5B is a front isometric view with an enlarged detail of a bearing assembly of an electric machine such as that illustrated in FIGS. 2A-2D, according to one illustrated embodiment of the disclosed systems, methods and apparatus.

Figure 1:
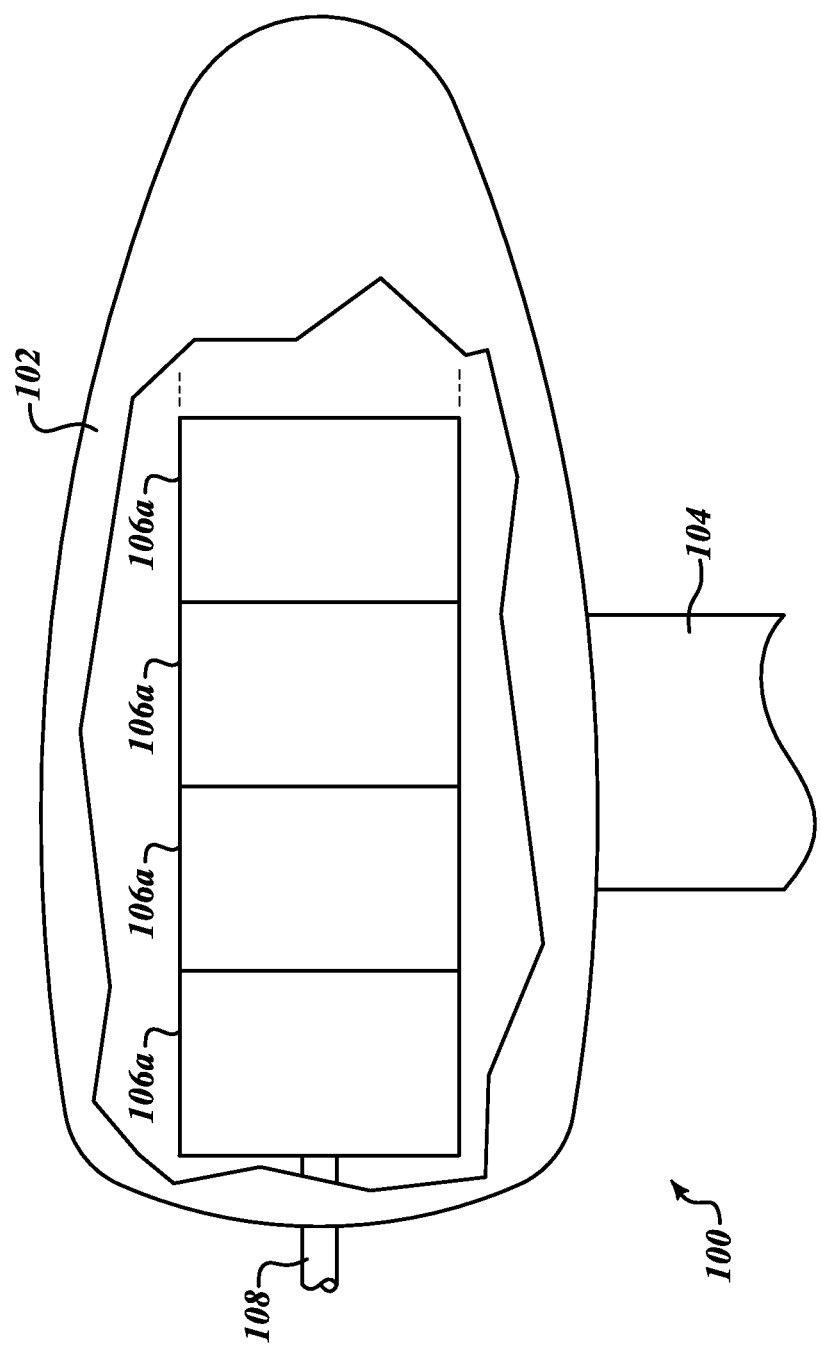
FIG. 1 is partial side elevation cutaway view of a wind turbine installation, showing a nacelle mounted proximate a top of a tower and a number of electric machines coupled to a drive shaft to be driven as electrical power generators, according to one illustrated embodiment of the disclosed systems, methods and apparatus.

FIG. 5B1 is an enlarged detail of the bearing assembly of FIG. 5B.

Figure 5C:
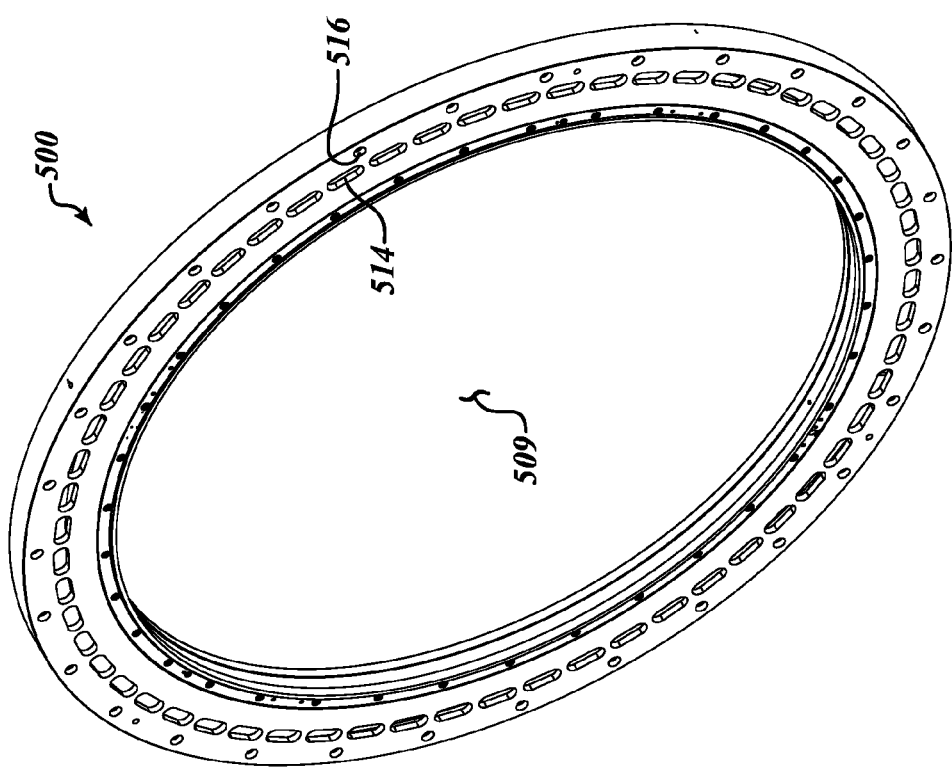

FIG. 5C is a front isometric view of a bearing outer race member of a bearing assembly such as that of FIGS. 5A and 5B, according to one illustrated embodiment of the disclosed systems, methods and apparatus.

Figure 5D:
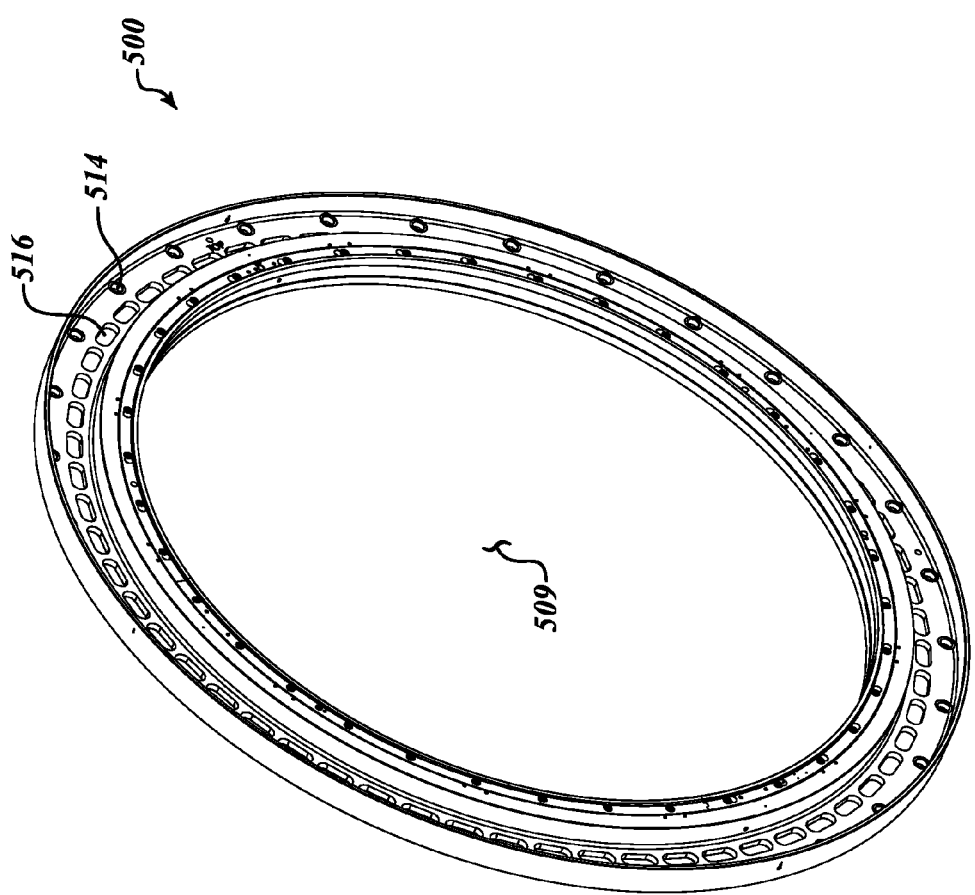

FIG. 5D is a rear isometric view of the bearing outer race member of a FIG. 5C.

Figure 5E:
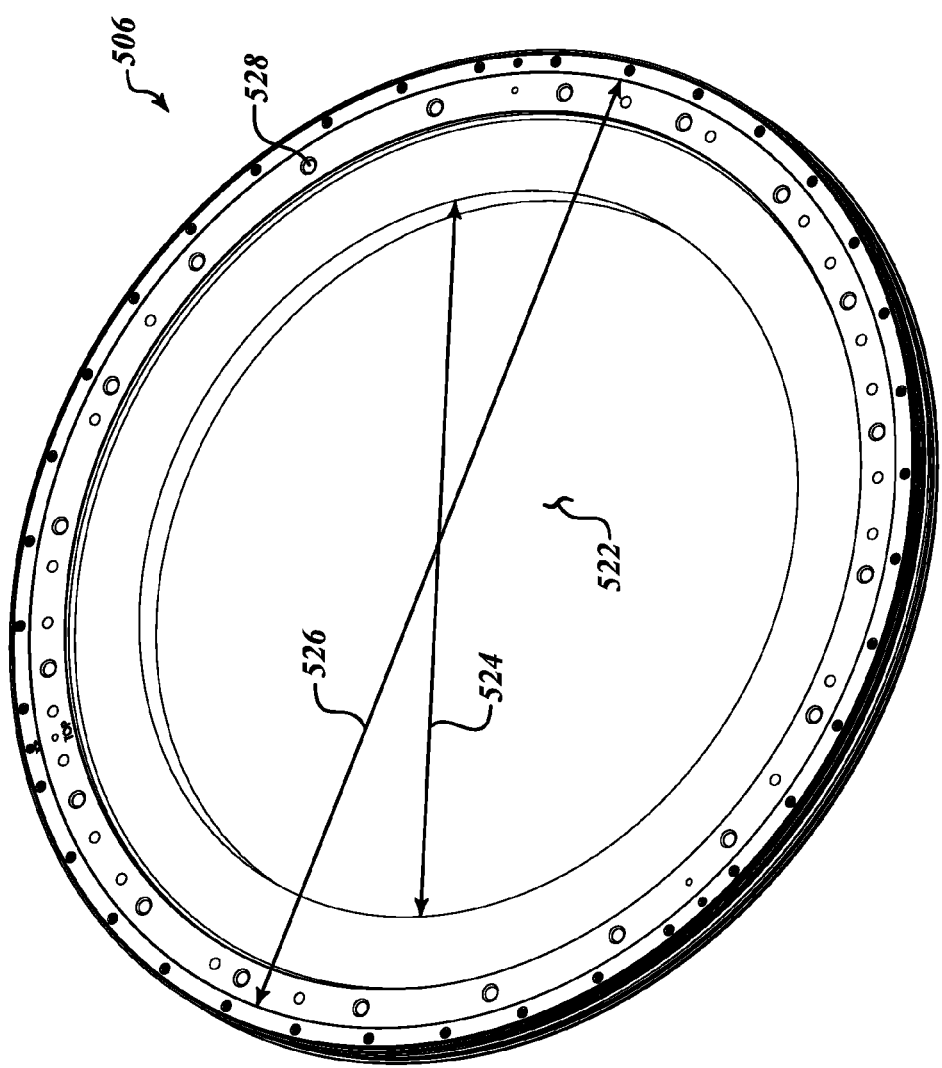

FIG. 5E is a front isometric view with a bearing inner race member of a bearing assembly such as that of FIGS. 5A and 5B, according to one illustrated embodiment of the disclosed systems, methods and apparatus.

Figure 5F:
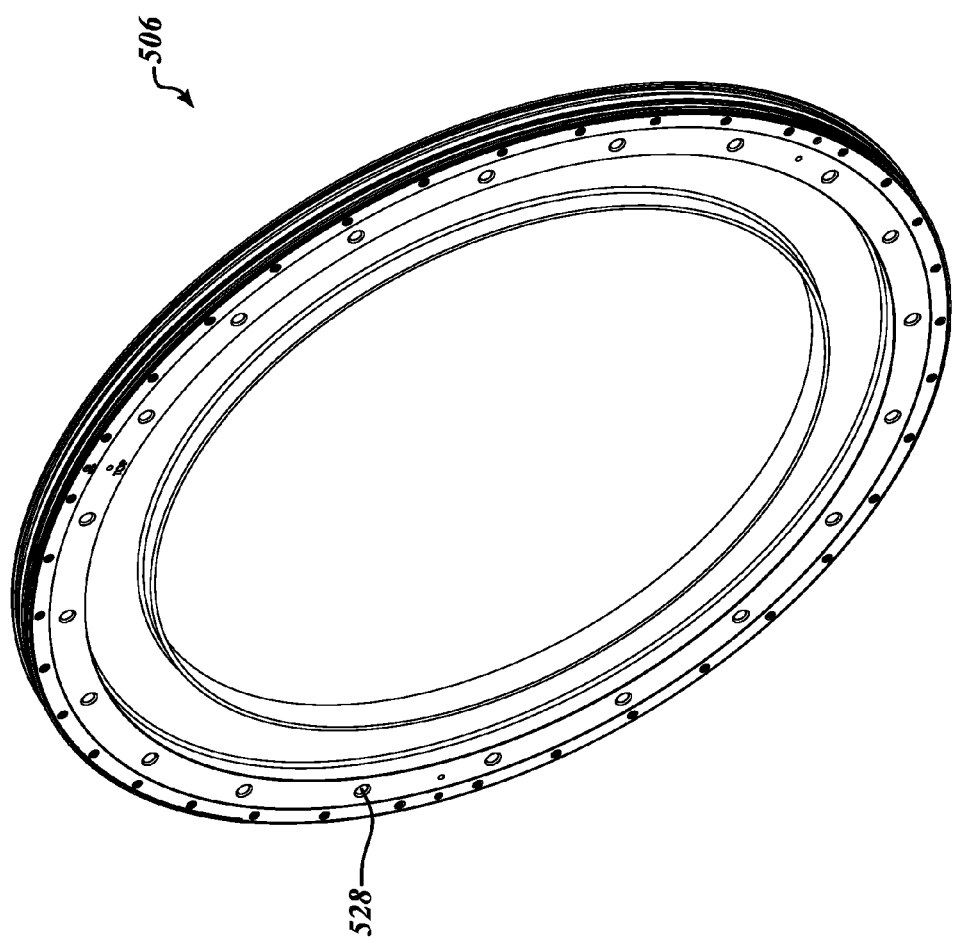

FIG. 5F is a rear isometric view with the bearing inner race member of FIG. 5E.

FIG. 6 is a cross-sectional view of a compensation fastener assembly used to physically compensatingly couple at least one of a rotor or stator of an electric machine, such as that illustrated in FIGS. 2A-2D, to at least one of a first or second race member, according to one illustrated embodiment of the disclosed systems, methods and apparatus.

Figure 7A:
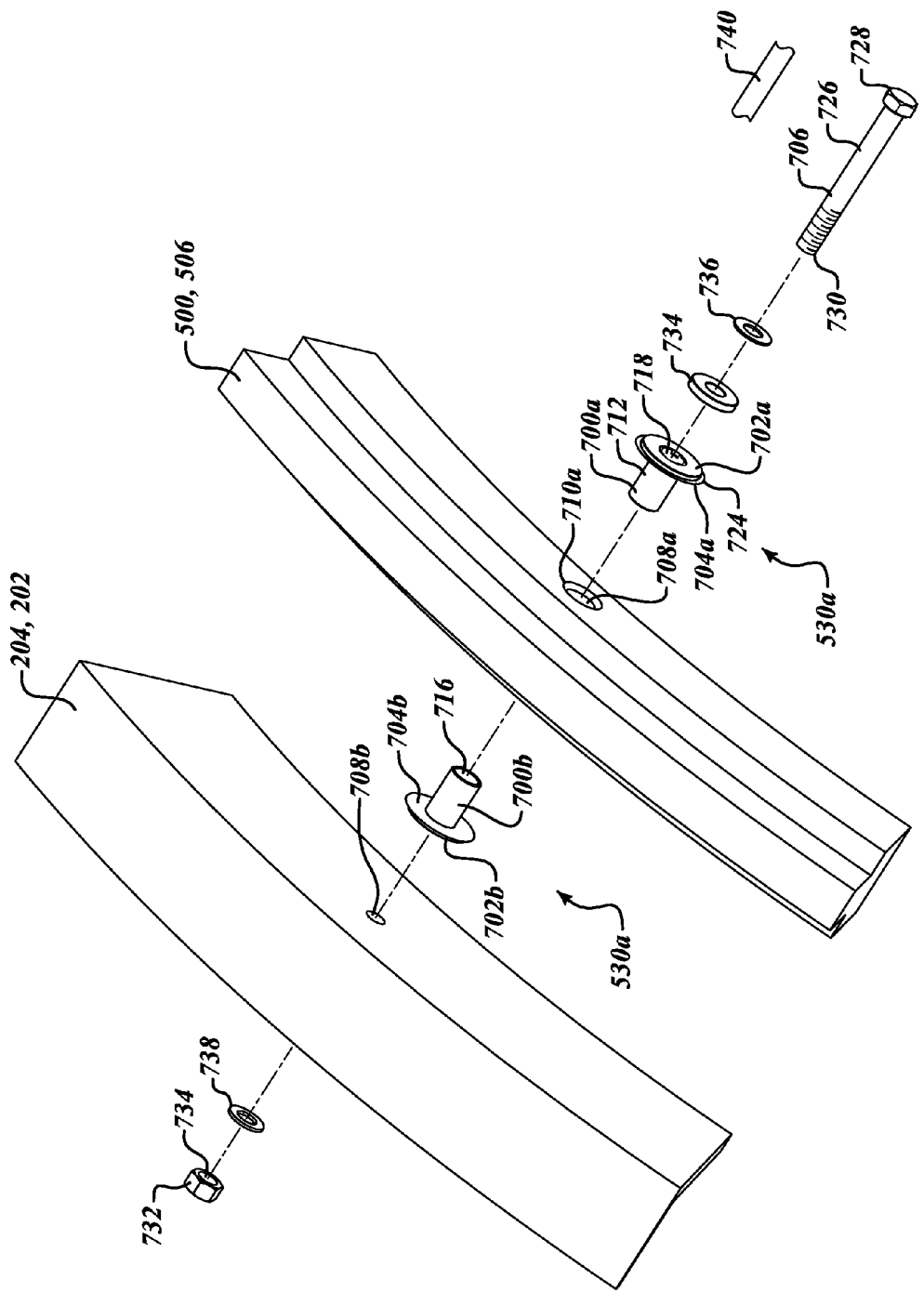

FIG. 7A is an exploded view of an electrically insulative fastener assembly used to fixedly electrically insulatively physically couple at least one of a first or second race member to at least one of a rotor or stator of an electric machine such as that illustrated in FIGS. 2A-2D, according to one illustrated embodiment of the disclosed systems, methods and apparatus.

Figure 7B:
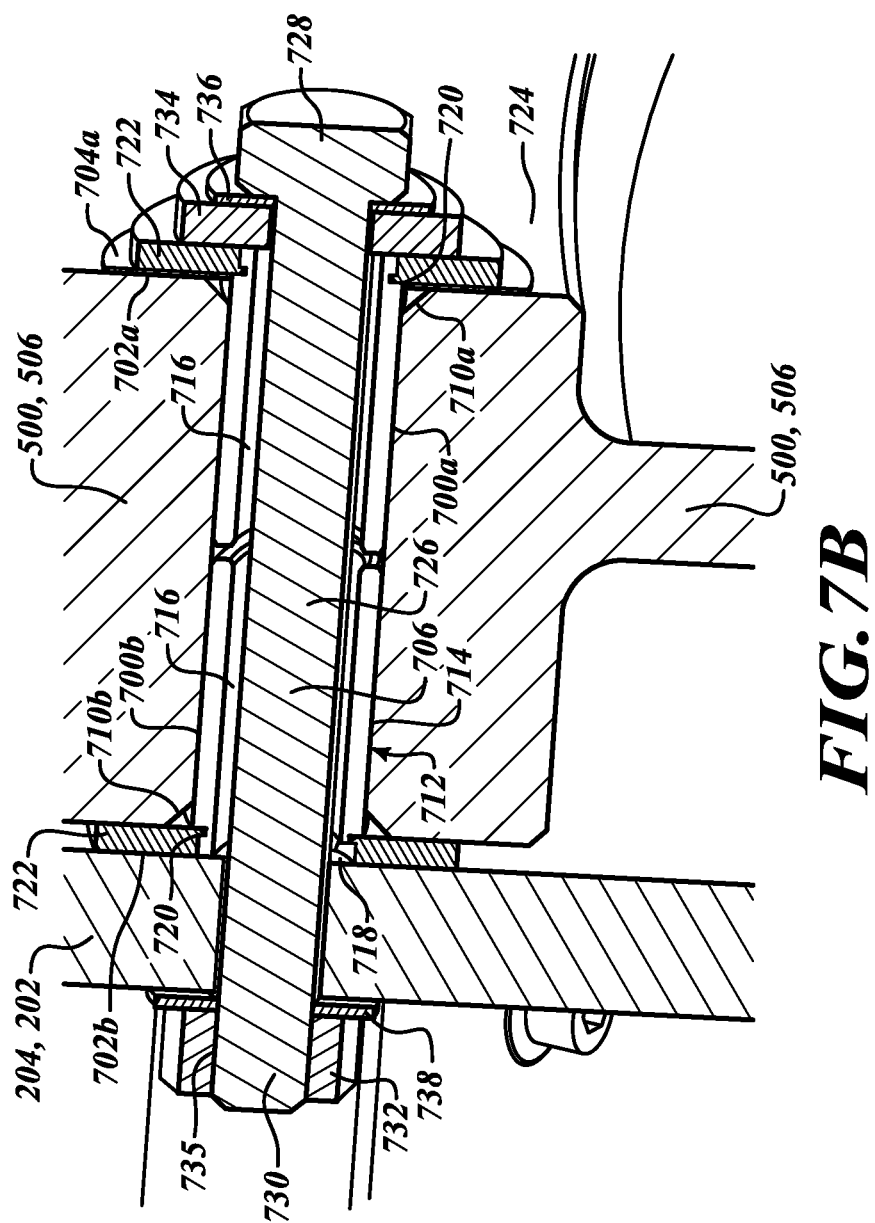

FIG. 7B is a cross-sectional view of the electrically insulative fastener assembly fixedly electrically insulatively physically coupling at least one of a first or second race member to at least one of a rotor or stator as illustrated in FIG. 6A.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with rotating electrical machines, for example generators and electric motors, and circuits and other systems associated with such rotating electrical machines have not been shown or described in detail to avoid unnecessarily obscuring descriptions of the embodiments of the present systems and methods.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the embodiments.

FIG. 1 shows a wind turbine installation 100, according to one illustrated embodiment of the disclosed systems, methods and apparatus.

The wind turbine installation 100 includes a nacelle 102 mounted proximate a top of a tower 104 (only a portion shown). The nacelle 102 houses a number of electric machines 106a-106d (four shown, collectively 106). The electric machines 106 are coupled to a drive shaft 108 to be driven as electrical power generators. The drive shaft 108 is in turn physically coupled to a blade (not shown), which converts wind to rotational motion of the drive shaft 108, which is in turn passed to the electric machines 106.

FIGS. 2A-2D show an electric machine 106, according to one illustrated embodiment of the disclosed systems, methods and apparatus.

The electric machine 106 comprises a stator assembly 202 and a rotor assembly 204. Typically, the stator assembly 202 remains fixed while the rotor assembly 204 is coupled for rotation with respect to the stator assembly 202. The electric machine 106 may include various other components. For example, the electric machine 106 may include one or more enclosures 206a, 206b, 206c (three shown, collectively 206), wiring 208 with contacts 208a (only one called out) to make electric connections and/or electronics. Also for example, the electric machine 106 may include one or more vents or conduits 210 to allow exhaust of warm air or ingress of cool air to address thermal concerns. The electric machine 106 may include conduits (not shown), pumps (not shown)

and/or injectors (not shown) to carry lubrication, for instance grease to various components. The electric machine 106 may include a debris tray to collect debris from operation. The electric machine 106 may include various sensors, for instance vibration sensors, electrical fault sensors, speed sensors or rotational encoders, voltage sensors, current sensors, etc.

The stator assembly 202 may be composed of a number of components, some of which are visible in one or more of FIGS. 2A-2D, and some of which are illustrated and described with reference to other figures discussed below. For instance, the stator assembly 202 includes a stator shell 212. The stator assembly 202 may include a plurality of stator outer flanges or webs 214 (three shown, only one called out for sake of drawing clarity) which are circumferential to the stator shell 212 and provide structural strength and rigidity or stiffness to the stator shell 212. The stator outer flanges 214 may be generally annular plates. The stator outer flanges 214 may include a plurality of apertures 216 to reduce weight and/or enhance air flow around the stator assembly 202. The stator assembly 202 may include a plurality of stator outer flange rings 218 which extend perpendicularly from respective ones of the stator outer flanges to form a T-shaped cross-section. The stator outer flange rings 218 may further enhance the strength and rigidity or stiffness of the stator assembly 202. The stator shell 212, stator outer flanges or webs 214 and/or stator outer flange rings 218 may be made of metal, for example steel, for instance Steel EN10025-2-S45JO.

Additionally, or alternatively, the stator assembly 202 may include a plurality of stator stringers 220. The stator stringers 220 may be attached to the outer periphery or outer peripheral surface 224 of the stator shell 212, extending parallel to the longitudinal axis 221 of the stator assembly 202. Such stator stringers 220 further enhance the rigidity or stiffness of the stator shell 212, without significantly increasing weight, allowing use of a stator shell 212 with a relatively thin wall thickness. The stator stringers 220 may be made of metal, for example steel, for instance Steel EN10025-2-S45JO.

The stator assembly 202 may include a pair of stator end flanges 226a, 226b (collectively 226) mounted to each end of the stator shell 202. The stator end flanges 226 may be generally annular plates. As discussed below, the stator end flanges 226 allow physical coupling of bearing structures to position the rotor assembly 204 with respect to the stator assembly 202. The stator end flanges 226 may also provide structural strength and rigidity to the stator shell 212. The stator end flanges 226 may be made of metal, for example steel, for instance Steel EN10025-2-S45JO.

The stator assembly 202 may include two or more brackets 228a, 228b (two shown, collectively 228) to allow the electric machine to be physically secured to support structure, for example in the nacelle 102 (FIG. 1). The brackets 228 may be secured or fixed to the stator outer flanges 214, for example via the stator outer flange rings 218.

Figure 2D:
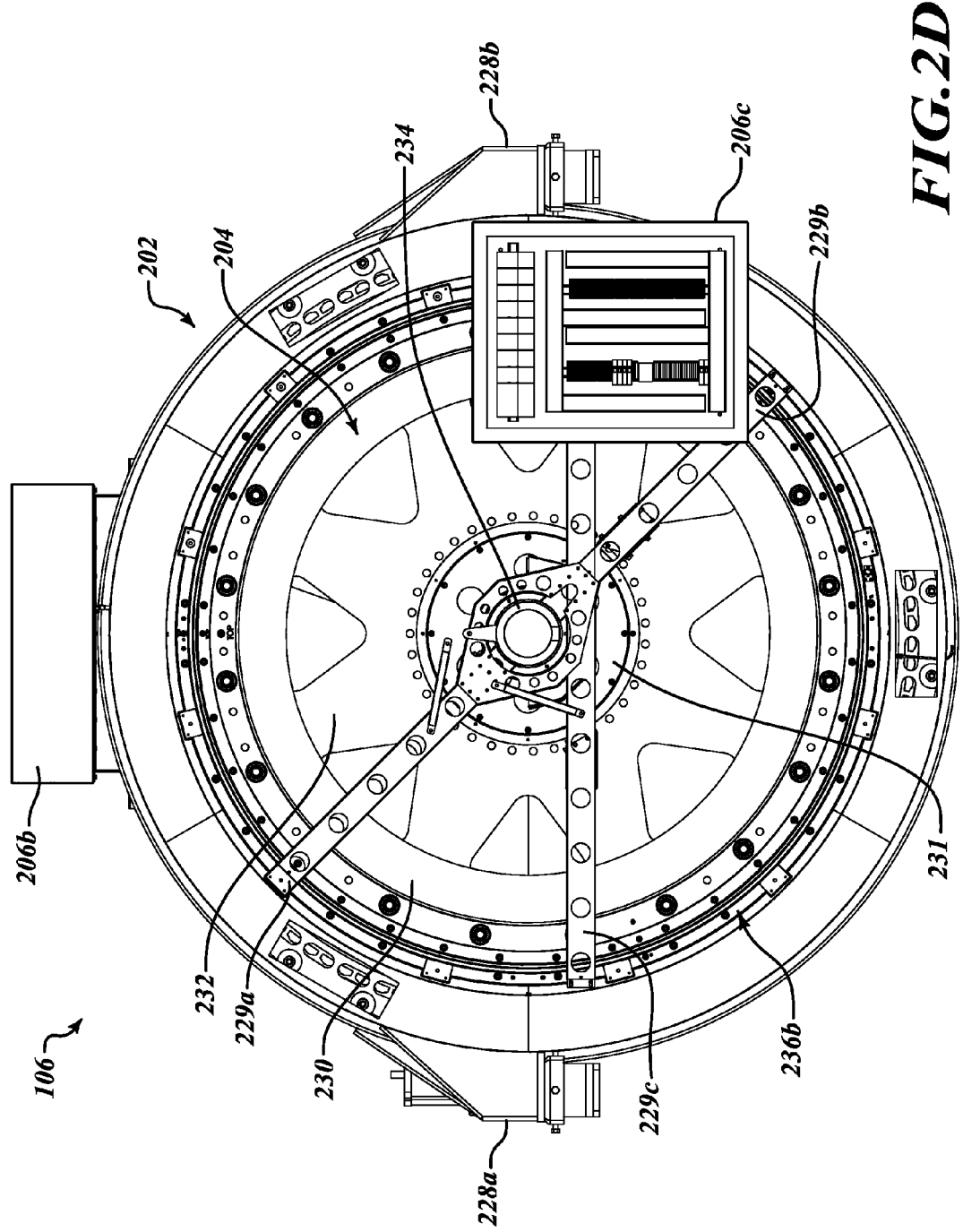
FIG. 2D is a rear elevational view of the electric machine of FIG. 2A.
Figure 3C:
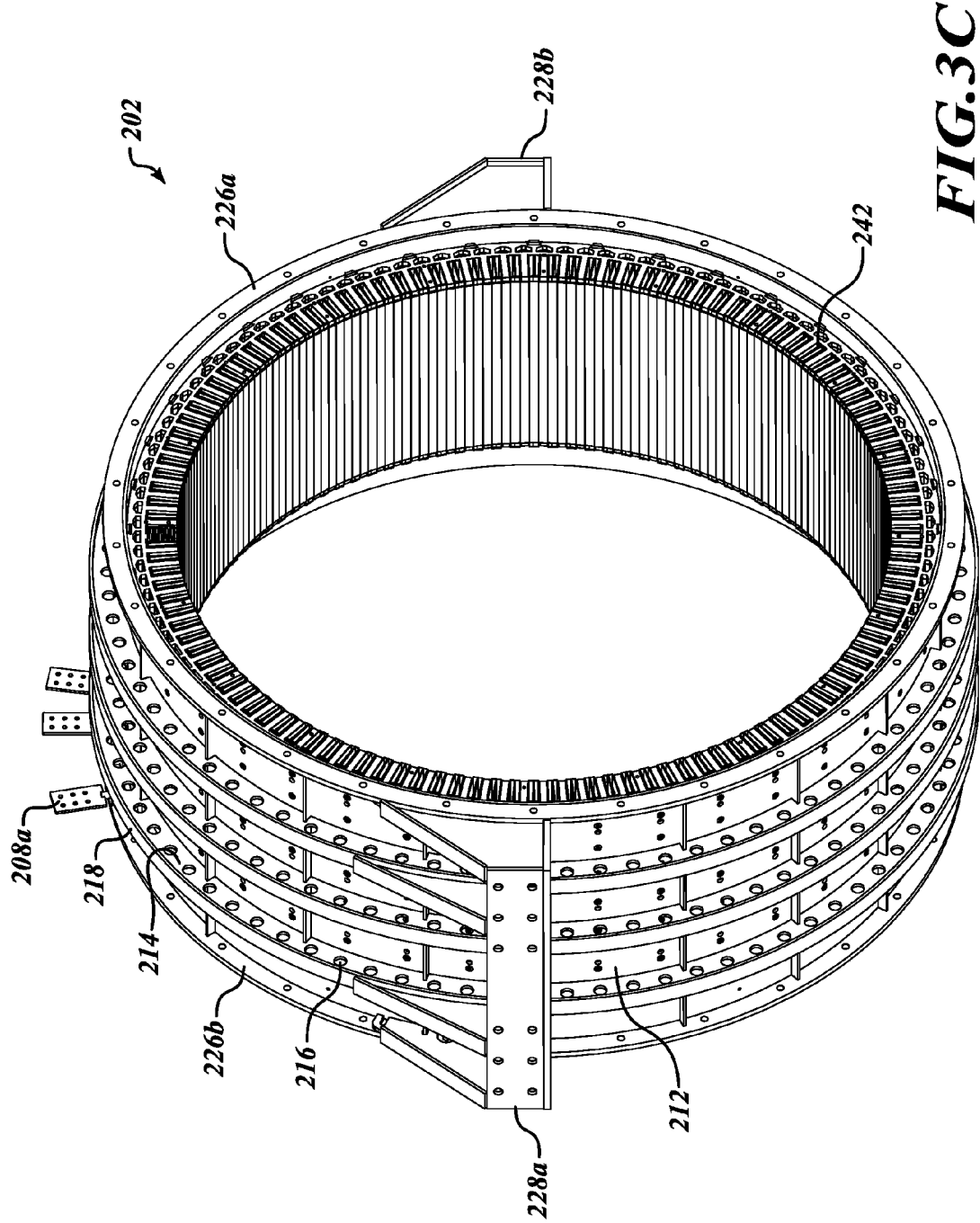
FIG. 3C is a right side elevational view of the stator assembly of FIG. 3A.
Figure 3D:
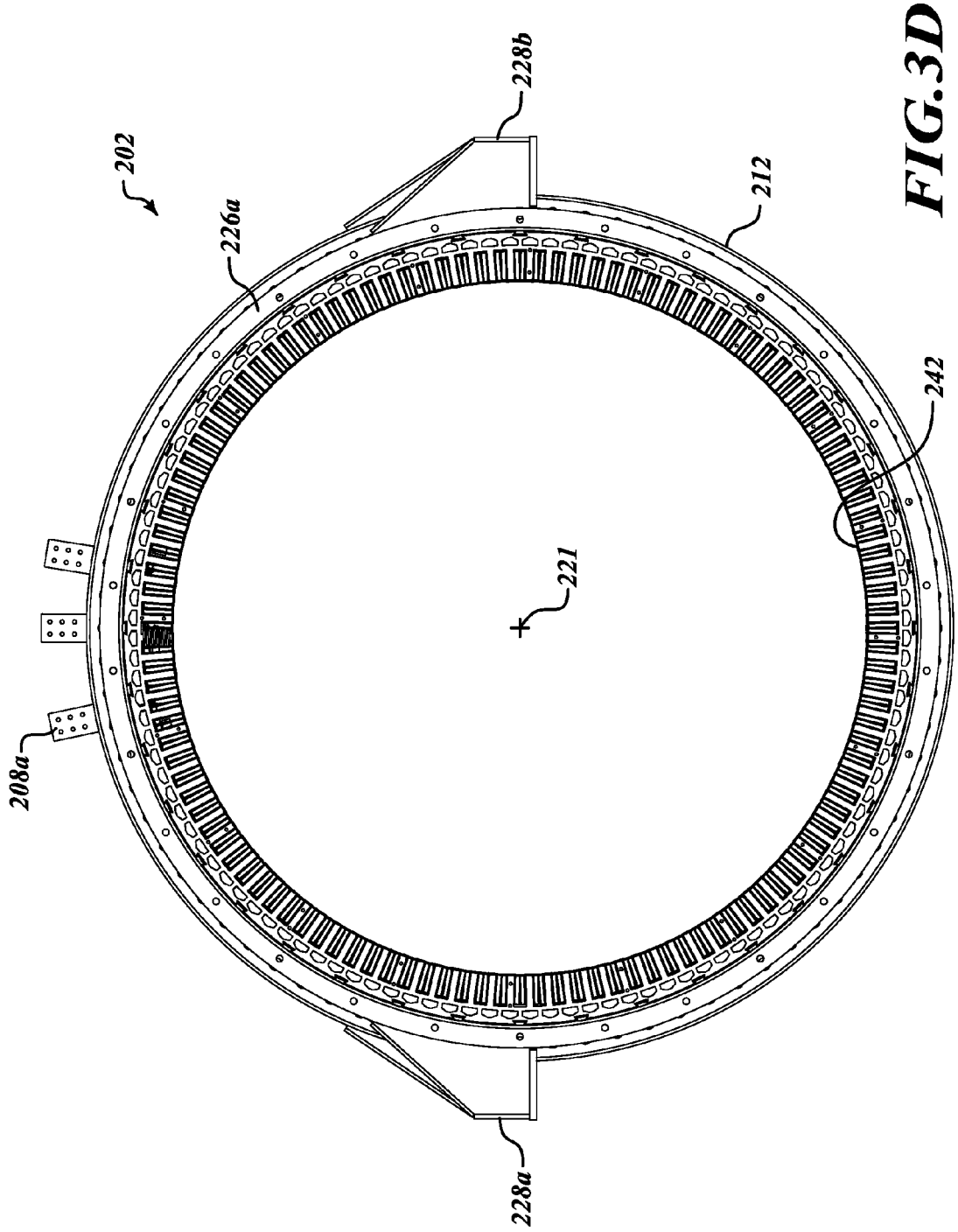
FIG. 3D is a rear elevational view of the stator assembly of FIG. 2A.
Figure 3E:
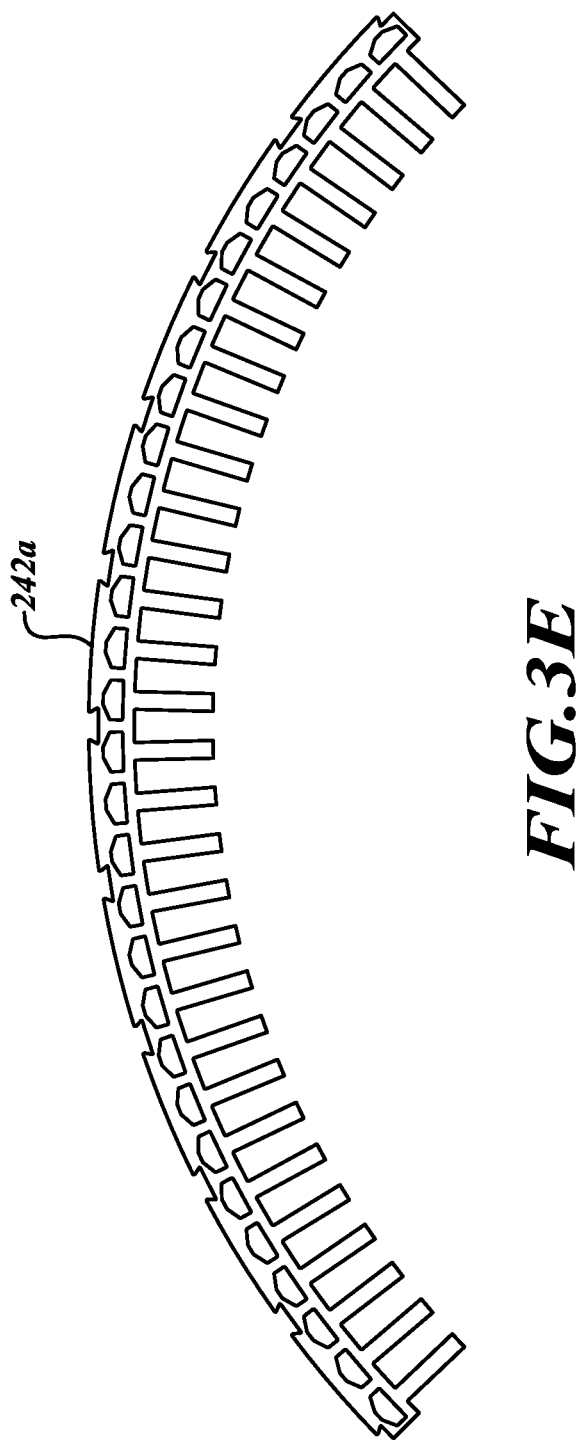
FIG. 3E is a front elevational view of a lamination which may form part of the stator assembly of FIGS. 3A-3D, in accordance with the present systems, methods and apparatus.

As best seen in FIG. 2D, a number of bars 229a, 229b, 229c (three shown) may extend across the stator assembly 202, for instance spanning across a central passage of the stator end flange 226. These bars may provide further strength and rigidity to the stator assembly 202.

Likewise, the rotor assembly 204 may be composed of a number of components, some of which are visible in one or more of FIGS. 2A-2D, and some of which are illustrated and described with reference to other figures discussed below. As illustrated in FIGS. 2A, 2B and 2D, the rotor assembly 204 may include a rotor shell 230. The rotor assembly 204 may also include a rotor drive disk 232 which is physically coupled to the rotor shell 230. The rotor drive disk 232 may include a hub 231 with a drive shaft 234, which is in turn coupled to a driven drive shaft (e.g., drive shaft 108 of FIG. 1). When the electric machine 106 is operated as an electric power generator to convert mechanical motion into electric power, the drive shaft 234 is driven by the drive shaft 108. Alternatively, when the electric machine 106 is operated as an electric motor to convert electric power into mechanical motion, the drive shaft 108 or some similar drive shaft, is driven by the drive shaft 234.

Also visible in FIGS. 2B and 2D are portions of a number of bearing assemblies 236a, 236b (two shown, collectively 236). The bearing assemblies 236 position the rotor assembly 204 for rotation with respect to the stator assembly 202. In at least some implementations, the bearing assemblies 236 may advantageously take the form of wire bearing assemblies, which are discussed in detail below.

FIGS. 3A-3E show a stator assembly 202 of an electric machine 106 (FIG. 1) such as that illustrated in FIGS. 2A-2D, according to one illustrated embodiment of the disclosed systems, methods and apparatus.

As described above, the stator assembly 202 includes the stator shell 212, stator outer flanges or webs 214, stator outer flange rings 218, stringers 220, stator end flanges 226, and brackets 228.

As introduced above, the stator assembly 202 may also include a pair of stator end flanges 226, coupled respectively to the stator shell 212 at each end of the stator shell 212. The stator end flanges 226 extend around the stator shell 212, providing rigidity to the stator shell 212. The stator end flanges 226 may extend radially inwardly from the stator shell 212, providing an attachment structure to physically couple to a portion of one of the bearing assemblies 236 (FIGS. 2B and 2D). The stator end flanges 226 include a plurality of fastener holes 240 (only one called out for sake of drawing clarity), preferably evenly disposed around the stator end flange 226.

In the illustrated embodiment the stator assembly carries windings or coils (not illustrated), hence also includes laminations 242 on which the windings or coils are typically wound or carried. A plurality of layers or rings of lamination 242 may be formed, extending along the longitudinal axis 221 of the stator assembly 202. To facilitate fabrication, each layer or ring of lamination 242 may be composed of a plurality of lamination segments 242a, best illustrated in FIG. 3E. The laminations 242 may comprise any of a variety of ferrous materials, for example electrical silicon steel type M19 which is for instance 0.25 thick and has a coating for instance C4.

The windings or coils (not shown) are formed by electrical conductors, for example wires wrapped about the laminations 242. Wire may be of any variety of electrically conductive materials, for instance copper. Wire may have a variety of cross-sectional profiles, for instance round, square, rectangular, oval, and may be of any of a large variety of gauges. The windings or coils may be electrically and/or environmentally sealed via any of a large variety of suitable encapsulants (not shown), for example lacquer which may be vacuum impregnated.

FIGS. 4A-4E show a rotor assembly 204 of an electric machine 106 (FIG. 1) such as that illustrated in FIGS. 2A-2D, according to one illustrated embodiment of the disclosed systems, methods and apparatus.

As described above, the rotor assembly 204 includes the rotor shell 230, rotor drive disk 232 and drive shaft 234.

Figure 4A:
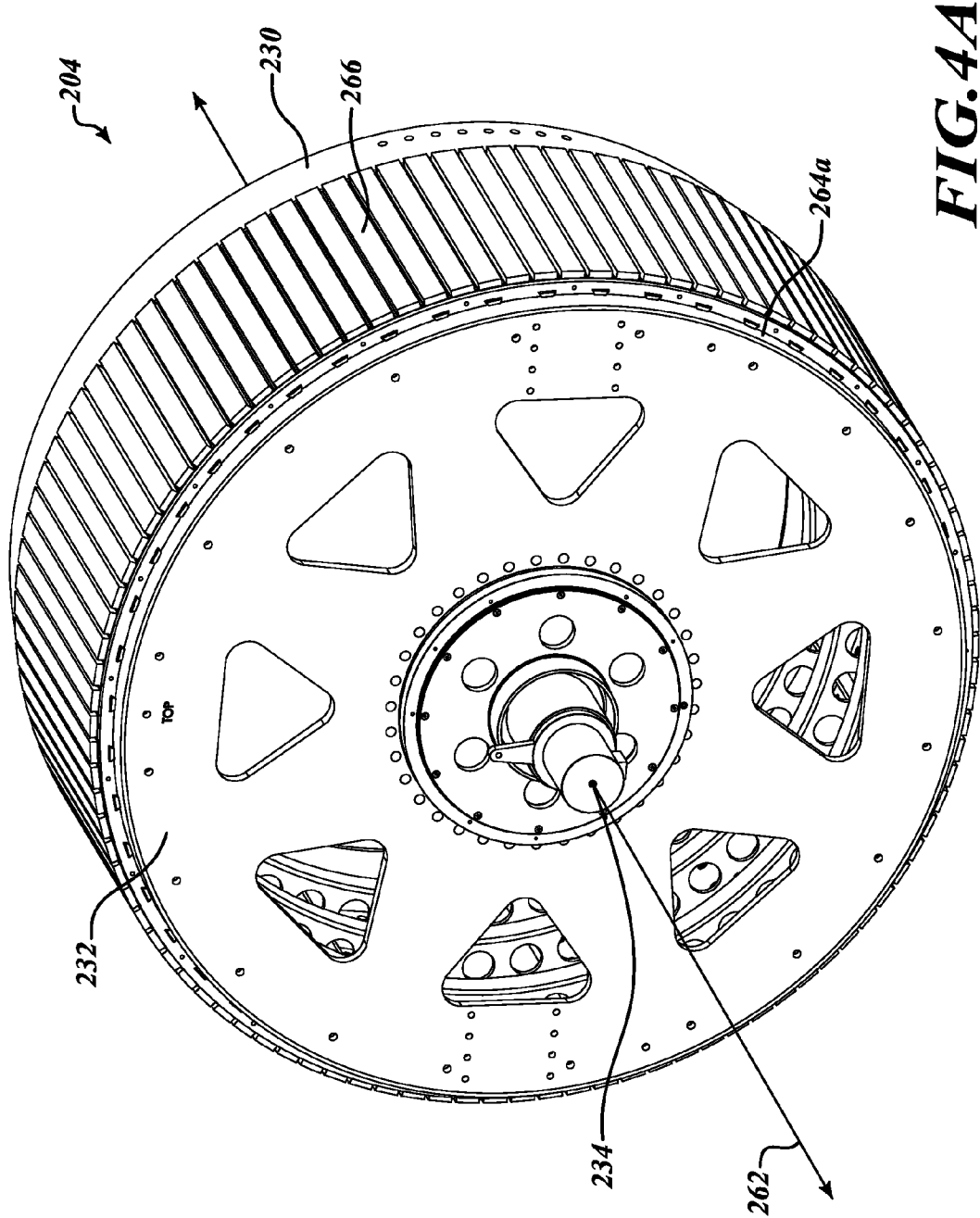
FIG. 4A is a front isometric view of a rotor assembly of an electric machine such as that illustrated in FIGS. 2A-2D, according to one illustrated embodiment of the disclosed systems, methods and apparatus.
Figure 4B:
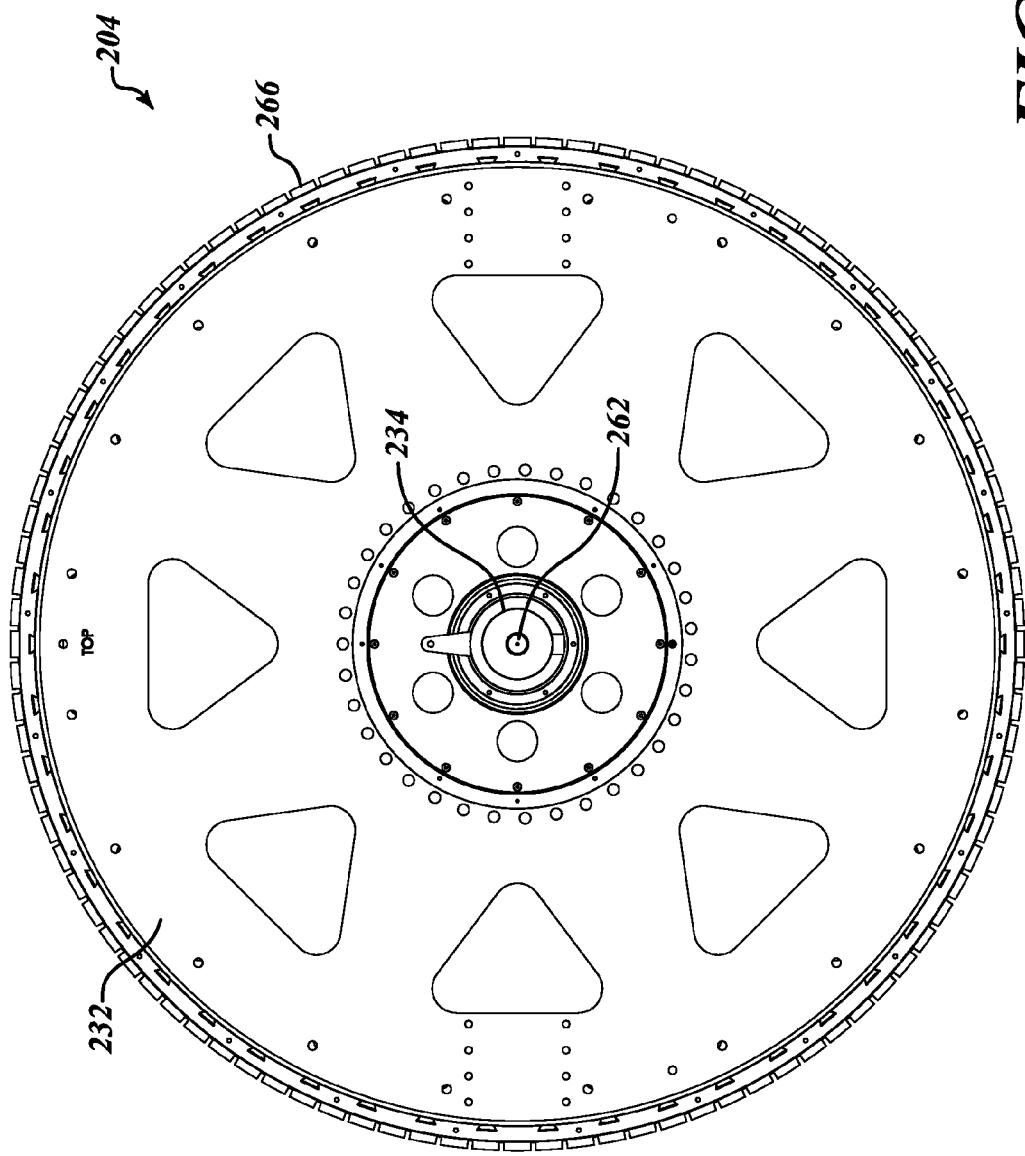
FIG. 4B is a front elevational view of the rotor assembly of FIG. 4A.
Figure 4C:
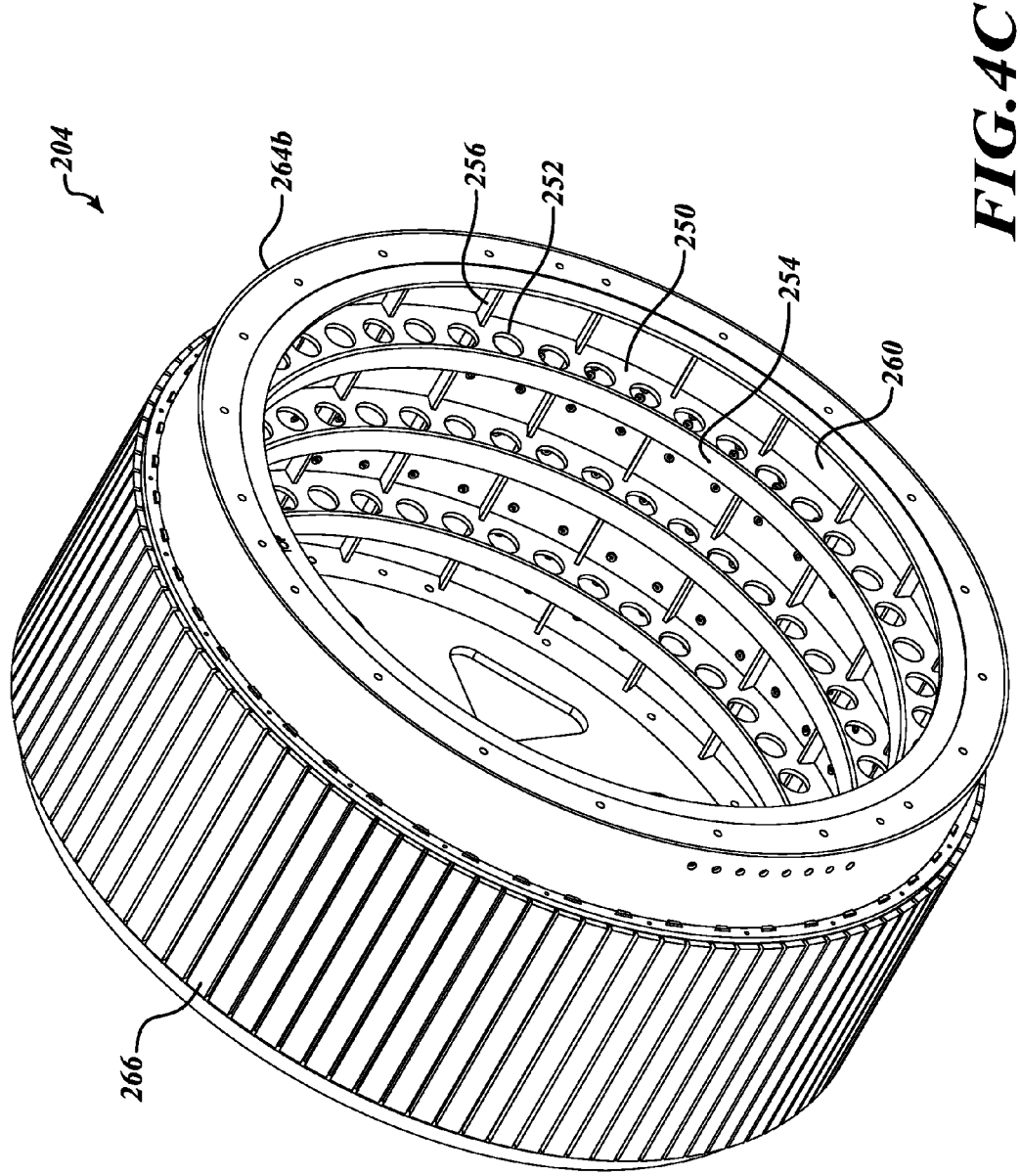
FIG. 4C is a rear isometric view of the rotor assembly of FIG. 4A.
Figure 4E:
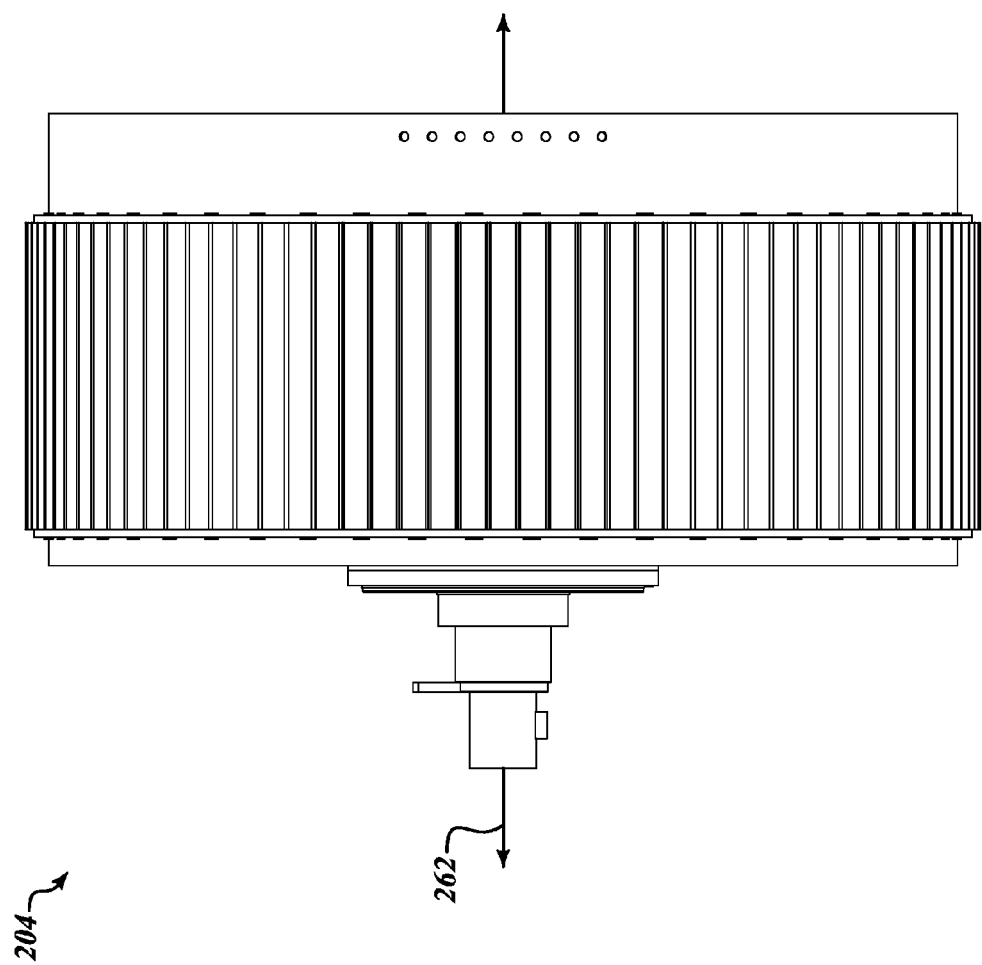
FIG. 4E is a right side elevational view of rotor assembly of FIG. 2A.

As best illustrated in FIG. 4C, the rotor assembly 204 may also include a plurality of rotor inner flanges or webs 250 which provide structural strength and rigidity to the rotor shell 230. The rotor inner flanges 250 may be generally annular rings or plates. The rotor inner flanges 250 may include a plurality of apertures 252 (only one called out for the sake of drawing clarity) to reduce weight and/or enhance air flow around or through the rotor assembly 204. The rotor assembly 204 may include a plurality of rotor inner flange rings 254 which extend perpendicularly from respective ones of the rotor inner flanges 250 to form a T-shaped cross-section. Such may further enhance the rigidity of the rotor assembly 204. Additionally, or alternatively, the rotor assembly 204 may include a plurality of rotor stringers 256. The rotor stringers 256 may be attached to the inner periphery 258 or inner peripheral surface 260 of the rotor shell 230, extending parallel to a longitudinal axis 262 of the rotor shell 230. Such rotor stringers 256 further enhance the rigidity or stiffness of the rotor shell 230, without significantly increasing weight. Such may allow use of a thinner walled rotor shell 230 than might otherwise be possible.

As best illustrated in FIGS. 4A and 4C, the rotor assembly 204 may also include a pair of rotor end flanges 264a, 264b (collectively 264), coupled respectively to the rotor shell 230 at each end of the rotor shell 230. The rotor end flanges 264 extend circumferentially from the rotor shell 230, providing strength and rigidity or stiffness to the rotor shell 230. The rotor end flanges 264 extend radially inwardly from the periphery 258 of the rotor shell 230 providing an attachment structure for attaching the rotor drive disk 232 to the rotor shell 230.

Various rotor components (e.g., rotor shell 230, rotor inner flanges or webs 250, rotor inner flange rings 254, and/or rotor stringers 256 may be made of metal, for example steel, for instance Steel EN10025-2-S45JO.

In the illustrated embodiment the rotor assembly 204 carries magnets 266 (only one called out for sake of drawing clarity). The magnets 266 may be physically coupled or attached to an outer peripheral surface of the rotor shell 230. For example, the magnets 266 may be adhered to the rotor shell 230 via any suitable adhesive having high bonding strength and excellent thermal conductivity, for example Duralco 4400 commercially available from Cotronics Corporation. The magnets 266 are typically permanent magnets, and preferably rare earth permanent magnets. The magnets 266 may, for example have convex upper surfaces (i.e., surface closest to stator windings when rotor is concentrically positioned in the stator cavity). The magnets 266 may, for example, have flat lower surfaces (i.e., surface which is mounted on rotor shell 230).

A outer race clamp ring and an inner race clamp ring may be used to physically couple the outer race member to the stator and the inner race member to the rotor, respectively.

FIG. 5A shows a stator assembly 202 of an electric machine 106 (FIG. 1) such as that illustrated in FIGS. 2A-2D, with a pair of bearing first race members 500a, 500b (collectively 500) positioned respectively at each end 502a, 502b (collectively 502), and a pair of electrically insulative rings 504a, 504b (collectively 504) received between the ends of the stator assembly 202 and respective bearing first race members 500a, 500b, according to one illustrated embodiment of the disclosed systems, methods and apparatus. The bearing assemblies 236 position the rotor assembly 204 for rotation with respect to the stator assembly 202 and transfer both axial and radial loads between the rotor and the stator assemblies 204, 202, respectively.

As illustrated in FIG. 5A, the pair of bearing first race members 500a, 500b which are part of the bearing assemblies 236a, 236b, respectively, are physically attachable at respective ends of the stator assembly 202, for example to stator end flanges 226 via fasteners (not shown in FIG. 5A). As illustrated in FIGS. 5B and 5B1, a pair of bearing second race members 506a, 506b (only one visible in FIGS. 5B and 5B1) which are part of the bearing assemblies 236a, 236b, respectively, are physically attachable at respective ends 508a, 508b (collectively 508) of the rotor assembly 204. (Notably, the magnets 226 are omitted from FIGS. 5B and 5B1 to improve drawing clarity.) Thus, the bearing assemblies 236 are spaced across a midpoint 504 (FIG. 3A) along the longitudinal axes 221, 262 from one another.

While only two bearing assemblies 236a, 236b are illustrated, in use there may be more than two bearing assemblies 236. For instance, there may be a pair of bearing assemblies 236 at or proximate a first end 502a, 508a and a pair of bearing assemblies 236 proximate a second end 502b, 508b of the electric machine 106 (FIG. 1). Such may be particularly advantageous where two or more electrical machines 106 (FIG. 1) are arranged successively to one another, such as illustrated in FIG. 1.

Where the rotor assembly 204 is positioned within the stator assembly 202, as illustrated, and the first race members 500 are physically attached to the stator assembly 202 and the second race members 506 are physically attached to the rotor assembly 204, the first race members 500 may be denominated as bearing outer race members 500 since such are disposed radially outwardly with respect to the second race members 506, and the second race members 506 may be denominated as bearing inner race members 506 since such are disposed radially inwardly with respect to the first race members 500. Other configurations are possible, for example where the rotor assembly 204 is positioned radially outward from the stator assembly 202. In such a configuration, the denominations outer and inner may be reversed from that employed in the following description. Even linear configurations are possible.

As illustrated in FIG. 5A, a pair of electrically insulative rings 504 are received between the stator assembly 202 and respective ones of the bearing outer race members 500. The electrically insulative rings 504 provide electrical insulation between the stator assembly 202 and the bearing outer race members 500. The electrically insulative rings should have a sufficiently high dielectric strength and sufficient dimensions (e.g., thickness) as to prevent electric arcing. The electrically insulative rings 504 are retained in place via clamping force applied to the electrically insulative rings 504 by the respective stator end flange 226 and the bearing outer race member 500. The clamping force has to be sufficiently high to withstand the forces that would otherwise cause the electrically insulative rings 504 to become dislodged.

As illustrated in FIGS. 5A-5D, the bearing outer race members 500 may be generally annular plates or flanges, having a central aperture 509a, 509b (FIG. 5A, collectively 508) with an inner diameter 510 (only one called out) and an outer periphery with an outer diameter 512 (only one called out). The bearing outer race members 500 may include a series of apertures or recesses 514 (FIGS. 5B and 5B1, only one called out) to reduce weight or mass, without significantly reducing strength or rigidity or stiffness. The bearing outer race members 500 may be mounted coaxially with the longitudinal axis 221 (FIG. 3A) of the stator shell 212, as shown in FIG. 5A. As shown in FIGS. 5A-5D, the bearing outer race members 500 include a plurality of fastener holes 516 (FIGS. 5B and 5B1, only one called out) sized to receive respective compensation fastener assemblies 518 (FIG. 6) to physically couple the bearing outer race members 500 to the stator end flanges 226. In particular, these compensation fastener assemblies 518 compensate for differences in thermal expansion which may occur between the stator and the rotor assemblies 202, 204, respectively, or components thereof. These compensation fastener assemblies 518 are illustrated and described in more detail below, with reference to FIG. 6.

As illustrated in FIGS. 5B, 5B1, 5E-5F the bearing inner race members 506 may be generally annular plates or flanges, having a central aperture 522 (FIG. 5E) with an inner diameter 524 and an outer periphery with an outer diameter 526. The bearing inner race members 506 may be mounted coaxially with the longitudinal axis 262 (FIG. 4A) of the rotor shell 230, as shown in FIGS. 5B and 5B1. As shown in FIGS. 5B, 5B1, and 5E-5F, the bearing inner race members 506 include a plurality of fastener holes 528 (only one called out) sized to receive respective electrically insulative fastener assemblies 530 (FIGS. 5B and 5B1) to physically electrically insulatively couple the bearing inner race members 506 to the rotor end flanges 264 or rotor drive disk 232. The electrically insulative fastener assemblies 530 are illustrated and described in more detail below, with reference to FIGS. 7A and 7B.

As best illustrated in FIGS. 5B and 5B1, a wire race 532 may be employed. The wire race 532 may, for example take the form of a four wire race, which includes four wires 534 (collectively) which form the race, and which retain a plurality of rolling elements 536 (e.g., ball bearings) therebetween. The wires 534 are typically hardened (e.g., hardened steel), and beveled or machined such that package of wires 534 (e.g., four wires fixed relative to one another) when viewed as a cross-section provides a relatively smooth conduit for the bearings 536. The machined surfaces may each be concave arcuate sections, which together from a conduit with a generally circular cross-section for the bearings 536 to ride. The wire race 532 may include a greater or fewer number of wires 534. Suitable wire race assemblies 532 may be commercially available, for example from Franke Gmbh of Germany. Alternatively, other types of bearing races may be employed. Additionally or alternatively, a bearing assembly 236 employing wheels may be employed instead of ball bearings. Wire races 532 may advantageously provide a particular light weight structure, as compared to other types of races or bearing assemblies 236.

As indicated above, the wire race 532 may be physically coupled to the stator assembly 202 and rotor assembly 204 via first and second race members 500, 506 or outer and inner race members. In some embodiments, portions of the stator assembly 202 and/or the rotor assembly 204 may serve as race members, in lieu of the discrete or separate first and/or second or outer and/or inner race members 500, 506. Thus, for example, a portion of an end flange 226, 264 may have fastener holes 516 (FIGS. 5C and 5D), 528 (FIGS. 5E and 5F), sized to receive the compensating fastener assemblies 518 or the electrically insulative fastener assemblies 530. Such may further reduce weight while maintaining sufficient strength and rigidity and stiffness.

FIG. 6 shows a compensation fastener assembly 518 in use to physically compensatingly couple at least one of a rotor assembly 204 or stator assembly 202 of an electric machine 106 (FIG. 1), such as that illustrated in FIGS. 2A-2D, to at least one of a first or second race member 500, 506, according to one illustrated embodiment of the disclosed systems, methods and apparatus. The compensation fastener assembly 518 compensates for differential expansion, for example where different components experience different degrees or amounts of thermal expansion. The differential expansion may be due to different amounts of heat to which the component is subjected, different amounts of cooling, and/or differences in materials from which the components are made. Compensation may be along a longitudinal axis. Such may be particularly valuable where two or more electric machines 106a-106d will be positioned successively in line with one another, for example as illustrated in FIG. 1.

In particular, each compensation fastener assembly 518 includes a pin 600 and a bolt 602, and optionally a nut 604 and/or washers (called out below). In use, the compensation fastener assembly 518 electrically insulatively slideably couples at least one of the stator assembly 202 or the rotor assembly 204 to at least one of the first or the second race members 500, 506 for relative translation therebetween.

The pin 600 has a tubular body 606 with a first end 608a, a second end 608b that has a face 610. The tubular body 606 has an outer periphery 612 with a hard bearing surface 614 along at least a portion of a length of the tubular body 606 positioned between the first and the second ends 608a, 608b. The pin 600 has a through passage 616 that extends through the tubular body 606 of the pin 600. The tubular body 606 of the pin 600 may be a circular cylindrical tubular body, and the through passage 616 of the pin 600 may be a longitudinal passage that extends through the first and the second ends 608a, 608b. The outer periphery 612 is sized to be received in a respective one of the fastener holes in the first or the second race member 500, 506 from a first direction (illustrated by arrow 618).

The tubular body 606 of the pin 600 may comprise steel or other sufficient strong and durable material. The hard bearing surface 614 extends along at least the portion of the length of the tubular body 606. The hard bearing surface 614 has a hardness substantially harder than a hardness of the face(s) 610. Relatively soft face(s) 610 allow the pin to securely cinch to the portion of the stator assembly 202 or rotor assembly 204 when the bolt is tightened via the nut 206. The hard bearing surface 616 may take the form of an electroless nickel plated surface. The face(s) 610 of the second end is not electroless nickel plated. The hard bearing surface 616 of the pin 600 extends along a distance that is greater than a width of a portion of the stator assembly 202 or the rotor assembly 204 through which the pin 600 passes, the portion of the stator assembly 202 or rotor assembly 204 mounted to slide along the hard bearing surface 614. As illustrated in FIG. 6, a gap 620 may exist between a portion of the stator assembly 202 or the rotor assembly 204 through which the pin 600 passes and a portion the first or the second bearing race member 500, 506 through which the pin 600 passes. The pin 600 is generally parallel with a longitudinal axis of the electric machine or axis of rotation of the rotor assembly 204. Thus, the gap 620 accommodates differential expansion, for example due to thermal differences between the stator assembly 202 and the rotor assembly 204. In use, the pin 600 is positioned such that the first and second ends 608a, 608b protrude from the first or the second race members 500, 506.

The first end 608a of the pin 600 may be tapered to facilitate assembly. Alternatively, the second end 608b may be tapered, or neither end may be tapered.

The bolt 602 has an outer perimeter 622 sized to be received through the through passage 616 of the respective pin 600. The bolt 602 has a head 624 and a threaded distal end 626. In some implementations, at least a portion of the threaded distal end 626 may be spaced from the head 622 to extend beyond the first or second race members 500, 506. In such an implementation, the compensation fastener assembly 518 may further include the nut 604, having threaded passage 628 sized and dimensioned to threadedly engage the thread distal end 626 of the bolt 602 of the respective fastener assembly 518. In other implementations, at least a portion of the threaded distal end 626 may be spaced from the head 622 to not extend beyond the end of the first or second race members 500, 506. In such an implementation, the fastener hole in the first or second race member may include an internal thread (i.e., tapped), to threadedly engage the thread distal end 626 of the bolt 602 of the respective fastener assembly 518.

The compensation fastener assembly 518 may include a number of metal washers. For example, a metal washer 630 may be positioned between the head 624 of the bolt 602 and the portion of the rotor or stator assemblies 204, 202 through which the bolt 602 passes. The metal washer 630 may be a Belleville washer. Additionally or alternatively, a metal washer 632 may be positioned between a face 610a of the first end 608a of the pin 600 and the nut 604. The metal washer 632 may be a flat washer. The metal washers 630, 632 may be steel washers.

A plurality of compensation fastener assembly 518 may be supplied as a kit, for example along with or without the first bearing assembly 236.

FIGS. 7A and 7B show an electrically insulative fastener assembly 530 used to fixedly electrically insulatively physically couple at least one of a first or second race member 500, 506, respectively, to at least one of the rotor assembly 204 or stator assembly 202 of an electric machine such as that illustrated in FIGS. 2A-2D, according to one illustrated embodiment of the disclosed systems, methods and apparatus.

Each electrically insulative fastener assembly 530 includes a first bushing 700a, a first plate 702a, a first electrically insulative member 704a, and a bolt 706.

Portions of the electrically insulative fastener assembly 530 may be received via fastener holes 708a in the race members 500, 506 and fastener holes 708b in the end flanges 226, 264 or other components of the stator or rotor assemblies 202, 204 of the electrical machine 106 (FIG. 1). The fastener holes 708a in the race members 500, 506 may have a larger diameter than the fastener holes 708b in the end flanges 226, 264 or other components of the stator or rotor assemblies 202, 204. The larger diameter fastener holes 708a may accommodate the first bushing 700a, while the smaller diameter fastener holes 708b may accommodate a portion of the bolt 706 exposed by or extending beyond the first bushing 700a. The fastener holes 708, particularly the fastener holes 708a in the race members 500, 506 may each include a countersink 710a, 710b (collectively 710). Each fastener hole 708a may include a countersink on both faces of the race member 500, 506 through which the fastener hole 708a extends. The countersinks 710 may advantageously reduce sharp edges or points which may otherwise be sources of electrical arcing, particular under high voltage conditions.

In some implementations, each electrically insulative fastener assembly 530 also includes a second bushing 700b, a second plate 702b, and a second electrically insulative member 704b. The second bushing 700b, second plate 702b, and second electrically insulative member 704b may, in some implementations, be identical in structure and function to the first bushing 700a, first plate 702a, and first electrically insulative member 704a, respectively. The second bushing 700b, second plate 702b, and second electrically insulative member 704b may be positioned on a side of the fastener hole 708a opposite to the side in which the first bushing 700a, first plate 702a, and first electrically insulative member 704a are positioned. Hence, the below discussion will generally not differentiate between the first and the second bushings (collectively 700), the first and the second plates (collectively 702), nor the first and the second electrically insulative members (collectively 704), except where any differences may be significant or notable.

The bushing 700 has a tubular body 712 with an outer surface or outer periphery 714 and a through passage 716 that extends through the tubular body 712 of the bushing 700. The outer periphery 714 has an outer diameter (OD) that is sized to be received in a respective one of the fastener holes 708 from a first direction, for example one of the fastener holes 708a in the first or the second race member 500, 506. The tubular body 712 may be sized to be press fit into a respective one of the fastener holes 708a. The tubular body 712 of the bushing 700 may be a circular cylindrical tubular body having a first end and a second end, and the through passage 716 may be a longitudinal passage that extends through the first and the second ends of the circular cylindrical tubular body 712.

The tubular body 712 may comprise an electrically insulative material having low deformation or compressibility, for example polyoxymethylene (e.g., Delrin).

Where the tubular body 712 is a plastic, for instance polyoxymethylene, the plate 702 may advantageously take the form of a metal disc having a central passage 718 which engages a retainer 720 on the outer surface or outer periphery 714 of the tubular body 712 of the bushing 700. Thus, the plate 702 and the tubular body 712 of the bushing 700 are each respective unitary pieces selectively coupled together. As illustrated, the retainer 720 may be a groove in the outer surface or outer periphery 714 of the tubular body 712 of the bushing 700. The plate 702 may be physically coupled to the tubular body 712 of the bushing 700, for example, via a snap fit with the groove.

The plate 702 has a periphery 722 that extends radially beyond the outer surface or outer periphery 714 of the tubular body 712 of the bushing 700. As noted above, the plate 702 may be made of metal, for example steel or another material which is not readily compressible under the expected loads. The plate 702 has a first side or face (not called out) and a second side or face (not called out). The first side or face of the plate 702 may face the rotor or stator assembly 204, 202 and the second side or face may face the first or the second race members 500, 506. The plate 702 may overlie the electrically insulative member 704 to retain the electrically insulative member 704 in place and prevent folding or curling thereof.

Alternatively, in some implementations the plate 702 may be aluminum or other material, and the first side may have a hard anodized surface (e.g., 2 mil thick) to provide an electrically insulative barrier that is not readily compressible. In such embodiments, the plate 702 may be a flange that is an integral unitary piece of the tubular body of the bushing 700. In such implementations, the electrically insulative member 704 may or may not be employed depending on the specific characteristics and dimensions of the assembly or installation.

The electrically insulative member 704 has a perimeter 724 that extends radially beyond the periphery 722 of the plate 702, and has a nominal thickness (e.g., 3 mils) sufficiently large to prevent electrical arcing. The electrically insulative member 704 may be plate- or membrane-like. For example, the electrically insulative member 704 may be a disc-shaped member with an aperture (not visible) sized to receive a portion of the bolt 706 therethrough. The electrically insulative member 704 may be positioned between the plate 702 and the first or the second race members 500, 506. The electrically insulative member 704 may, for instance, comprise a polyester sheet (e.g., biaxially oriented polyethylene terephthalate polyester material or MYLAR®) at least 3 mils thick.

The bolt 706 has an outer perimeter 726 sized to be received through the through passage 716 of the respective bushing 700. The bolt 706 may have a head 728 and a threaded distal end 730 spaced from the head 728. In some implementations, at least a portion of the threaded distal end 730 is spaced from the head 728 to extend beyond the portion of the rotor or the stator assembly 204, 202, respectively, through which the bolt 706 passes. In such implementations, each fastener assembly 530 further includes a nut 732 having threaded passage 735 sized and dimensioned to threadedly engage the threaded distal end 730 of the bolt 706 of the respective fastener assembly 530. Alternatively, in other implementations, at least a portion of the threaded distal end 730 may be spaced from the head 728 to engage a complimentary thread of the respective fastener hole 708b of at least one of the rotor or the stator assembly 204, 202, respectively.

Each of the electrically insulative fastener assemblies 530 may further include a number of washers. For example, the electrically insulative fastener assemblies 530 may include a flat washer 734 and a Bellville washer 736 positioned between the head 728 of the bolt 706 and the first side of the plate 702. The flat washer 734 should be a heavy washer. Also for example, the electrically insulative fastener assemblies 530 may include a flat washer 738 positioned between the nut 732 and the portion of the rotor or stator assembly 204, 202, respectively, through which the bolt 706 passes. The washers 734, 736, 738 may all be metal washers, for example steel washers.

Each of the electrically insulative fastener assemblies 530 may further include a number of plastic inserts 740 (FIG. 7A) received in the through passage 716 of the bushings 700, positioned between the bolt 706 and a respective inner surface of the through passages 716 of the bushings 700.

A plurality of electrically insulative fastener assemblies 530 may be supplied as a kit, for example along with a bearing assembly 536 or portion thereof, and/or with a stator and/or rotor assembly or portion thereof.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus, not necessarily the exemplary systems, methods and apparatus generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. provisional patent application Ser. No. 61/711,086 filed Oct. 8, 2012, are incorporated herein by reference, in their entirety. Aspects of the embodiments can be modified, if necessary, to employ systems, structures, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electric machine, comprising:
a first stator;
a first rotor that in use is rotatable about a longitudinal axis with respect to the first stator;
a first wire bearing assembly which positions the first rotor for rotation with respect to the first stator, the first wire bearing assembly comprising a first plurality of wire race members, and a first plurality of bearings retained by the first plurality of wire race members;
at least a second wire bearing assembly which positions the first rotor for rotation with respect to the first stator, the second wire bearing assembly comprising a second plurality of wire race members, and a second plurality of bearings retained by the second plurality of wire race members, the first stator and the first rotor electrically isolated from one another;
a third wire bearing assembly which positions the first rotor for rotation with respect to the first stator, the third wire bearing assembly comprising a third plurality of wire race members, and a third plurality of bearings retained by the third plurality of wire race members; and
a fourth wire bearing assembly which positions the first rotor for rotation with respect to the first stator, the fourth wire bearing assembly comprising a fourth plurality of wire race members, and a fourth plurality of bearings retained by the fourth plurality of wire race members, and wherein
the first and the third wire bearing assemblies are spaced on a first side of a midpoint of along the longitudinal axis and the second and the fourth wire bearing assemblies are spaced on a second side of the midpoint of the longitudinal axis, the second side being opposed to the first side.

2. The electric machine of claim 1 wherein the first and the second wire bearing assemblies transfer both axial and radial loads between the first rotor and the first stator.

3. The electric machine of claim 1 wherein the first and the second wire bearing assemblies are spaced across a midpoint along the longitudinal axis from one another.

4. The electric machine of claim 1 wherein each of the first and at least the second wire bearing assemblies further comprises a respective pair of housing portions which form a respective housing that retains the respective plurality of wire race members, each of the housing portions having a plurality of fastener holes.

5. The electric machine of claim 1 wherein each wire bearing assembly includes four hardened steel wire races members.

6. An electric machine, comprising:
a first stator;
a first rotor that in use is rotatable about a longitudinal axis with respect to the first stator;

a first wire bearing assembly which positions the first rotor for rotation with respect to the first stator, the first wire bearing assembly comprising a first plurality of wire race members, and a first plurality of bearings retained by the first plurality of wire race members; and at least a second wire bearing assembly which positions the first rotor for rotation with respect to the first stator, the second wire bearing assembly comprising a second plurality of wire race members, and a second plurality of bearings retained by the second plurality of wire race members, the first stator and the first rotor electrically isolated from one another, wherein each of the first and at least the second wire bearing assemblies further comprises a respective pair of housing portions which form a respective housing that retains the respective plurality of wire race members and the housing portions are aluminum and the wire race members are hardened steel.

7. An electric machine, comprising:

a first stator;

a first rotor that in use is rotatable about a longitudinal axis with respect to the first stator;

a first wire bearing assembly which positions the first rotor for rotation with respect to the first stator, the first wire bearing assembly comprising a first plurality of wire race members, and a first plurality of bearings retained by the first plurality of wire race members; and at least a second wire bearing assembly which positions the first rotor for rotation with respect to the first stator, the second wire bearing assembly comprising a second plurality of wire race members, and a second plurality of bearings retained by the second plurality of wire race members, the first stator and the first rotor electrically isolated from one another, wherein each of the first and at least the second wire bearing assemblies further comprises a respective pair of housing portions which form a respective housing that retains the respective plurality of wire race members, each of the housing portions having a plurality of fastener holes, wherein each of the first and at least the second wire bearing assemblies further comprises a respective pair of housing portions which form a respective housing that retains the respective plurality of wire race members, each of the housing portions having a plurality of fastener holes; and a plurality of fastener assemblies that fixedly electrically insulatively physically couple at least one of the first rotor or the first stator to a respective one of the housing portions of at least one of the first or the second wire bearing assemblies.

8. The electric machine of claim 7 wherein each electrically insulative fastener assembly comprises:

a first bushing having a tubular body with an outer periphery and a through passage that extends through the tubular body of the first bushing, the outer periphery sized to be received in a respective one of the fastener holes in the housing portions from a first direction;

a first plate that extends radially beyond the outer periphery of the tubular body of the first bushing; and a bolt having an outer perimeter sized to be received through the through passage of the respective first bushing.

9. The electric machine of claim 8 wherein the tubular body has a hard anodized outer surface.

10. The electric machine of claim 8 wherein the tubular body is polyoxymethylene, the first plate is steel, and further comprising:

a dielectric plate that extends radially beyond the outer periphery of the tubular body of the first bushing from proximate a first end thereof and spaced relatively toward a second end thereof with respect to the first plate.

11. The electric machine of claim 8 wherein each electrically insulative fastener assembly further comprises:

a second bushing having a tubular body with a hard anodized outer surface, an outer periphery and a through passage that extends through the tubular body of the second bushing, the outer periphery sized to be received in a respective one of the fastener holes in the inner or the outer race member from a second direction, opposite the first direction; and a second plate that extends radially beyond the outer periphery of the tubular body of the second bushing.

12. The electric machine of claim 11 wherein each electrically insulative fastener assembly further comprises:

a number of plastic inserts received in the through passage of the first and the second bushings, positioned between the bolt and a respective inner surface of the through passages of the first and the second bushings.

13. The electric machine of claim 7 wherein a first housing portion of the pair of housing portions is an outer race member and the second race housing portion is an inner race member spaced radially inward with respect to the outer race member, and the plurality of wire race members are retained between the outer and the inner race members, and further comprising:

at least one electrical insulation ring between the first or the second race member and an end plate of one of the first rotor or first stator.

14. The electric machine of claim 13 wherein the inner race member is bolted to an end plate of the first rotor.

15. An electric machine, comprising:

a first stator;

a first rotor that in use is rotatable about a longitudinal axis with respect to the first stator;

a first wire bearing assembly which positions the first rotor for rotation with respect to the first stator, the first wire bearing assembly comprising a first plurality of wire race members, and a first plurality of bearings retained by the first plurality of wire race members;

at least a second wire bearing assembly which positions the first rotor for rotation with respect to the first stator, the second wire bearing assembly comprising a second plurality of wire race members, and a second plurality of bearings retained by the second plurality of wire race members, the first stator and the first rotor electrically isolated from one another;

a second stator;

a second rotor that in use is rotatable about a longitudinal axis with respect to the second stator; and at least two additional wire bearing assemblies which position the second rotor for rotation with respect to the second stator, the first stator and the first rotor electrically isolated from one another, and the second rotor mechanically coupled to be driven along with the first rotor.

* * * * *